US012190321B2

(12) United States Patent
Dorcey et al.

(10) Patent No.: US 12,190,321 B2
(45) Date of Patent: Jan. 7, 2025

(54) LEVERAGING TAMPER-RESISTANT HARDWARE TO TRANSFER DIGITAL CURRENCY BETWEEN LOCAL DEVICES

(71) Applicant: ExtoLabs, LLC, Topanga, CA (US)

(72) Inventors: Timothy Dorcey, Santa Monica, CA (US); Orang Dialameh, Topanga, CA (US)

(73) Assignee: ExtoLabs, LLC, Topanga, CA (US)

( * ) Notice: Subject to any disclaimer, the term of this patent is extended or adjusted under 35 U.S.C. 154(b) by 1 day.

(21) Appl. No.: 17/449,677

(22) Filed: Oct. 1, 2021

(65) Prior Publication Data

US 2022/0108316 A1 Apr. 7, 2022

Related U.S. Application Data

(60) Provisional application No. 63/086,451, filed on Oct. 1, 2020.

(51) Int. Cl.
*G06Q 20/40* (2012.01)
*G06Q 20/06* (2012.01)
*G06Q 20/38* (2012.01)

(52) U.S. Cl.
CPC ....... *G06Q 20/4014* (2013.01); *G06Q 20/065* (2013.01); *G06Q 20/389* (2013.01); *G06Q 20/407* (2013.01)

(58) Field of Classification Search
CPC ......... G06Q 20/4014; G06Q 20/06389; G06Q 20/407; G06Q 20/0655; G06Q 20/367; G06Q 20/403
See application file for complete search history.

(56) References Cited

U.S. PATENT DOCUMENTS

2005/0191448 A1 9/2005 Suh et al.
2009/0130427 A1 5/2009 Grigoropoulos et al.
(Continued)

FOREIGN PATENT DOCUMENTS

WO WO-0184771 A1 * 11/2001 ............. G06Q 20/04
WO WO-2018232493 A1 * 12/2018 ........... G06Q 20/382

OTHER PUBLICATIONS

The University of Edinburgh, Goodfriend et al., "Blister-based laser induced forward transfer: A non-contact, dry laser-based transfer method for nanomaterials," pp. 1-25, Jul. 2018, United Kingdom.

*Primary Examiner* — Courtney P Jones
*Assistant Examiner* — Christine Dang
(74) *Attorney, Agent, or Firm* — Tatonetti IP

(57) ABSTRACT

A digital transaction is secured by leveraging tamper-resistant hardware associated with at least one of the devices involved in the transaction. The mechanism that controls the transaction between a sending device and a receiving device, such as the application or an application plugin, is configured to allocate a high degree of trust to at least one of the devices with tamper-resistant hardware. This way, any confirmations and representations from the device with the tamper-resistant hardware can be trusted and locally relied upon. The tamper-resistant device is configured with rules to prevent certain actions, such as double spending and overspending, among other rules. Thus, so long as the receiving device can verify that the sending device is configured with tamper-resistant hardware, the receiving device can trust that the sending device is acting within the confines of its prescribed rules and that the money will transfer.

11 Claims, 16 Drawing Sheets

(56) References Cited

U.S. PATENT DOCUMENTS

| | | | |
|---|---|---|---|
| 2017/0132633 A1* | 5/2017 | Whitehouse | H04L 63/08 |
| 2018/0110127 A1 | 4/2018 | Alloncle et al. | |
| 2019/0140852 A1* | 5/2019 | Kreft | G06F 21/335 |
| 2019/0205859 A1* | 7/2019 | Torres da Silveira | G06Q 20/32 |
| 2019/0286805 A1* | 9/2019 | Law | G06F 21/34 |

* cited by examiner

1300

1400

LEVERAGING TAMPER-RESISTANT HARDWARE TO TRANSFER DIGITAL CURRENCY BETWEEN LOCAL DEVICES

CROSS-REFERENCES TO RELATED APPLICATIONS

This Non-Provisional application claims the benefit of and priority to U.S. Provisional Application Ser. No. 63/086,451, filed Oct. 1, 2020, entitled "An Asynchronous Distributed Ledger with High Concurrency and Byzantine Fault Tolerance," the entire contents of which is hereby incorporated herein by reference.

BACKGROUND

The emergence of cryptocurrencies, mobile payments, and new banking regulations, among other developments, have triggered an explosion of interest in digital payment technologies. At the heart of these digital payment systems usually lies a digital ledger. A common approach to securely maintain a digital ledger is to distribute copies across multiple nodes. The challenge then is to keep the ledgers synchronized and responsive to updates while contending with system faults and network disruptions. Ledger synchronization is a challenge since faults may be crafted by an intelligent adversary whose aim is to corrupt the system, in which such faults are commonly referred to as "Byzantine Faults."

Beyond synchronizing ledgers, securing peer-to-peer digital transactions between personal wallets also poses problems. When a payment is transferred over an unreliable communication channel, determining whether a digital payment has successfully transferred to another party over an unreliable communication may be difficult. For example, suppose the channel fails immediately after a payment is sent. In that case, the sender cannot know whether the payment failed, or they merely failed to receive confirmation that the transfer was successful. The true status may eventually be discovered when communications are restored, but deferred resolution presents problems in live settings.

For example, in a retail setting, the customer would like to leave the store with the money they came in with or the goods they purchased. If they leave believing their payment has failed, they may not notice if a charge later appears on their account. If they do notice, it may be challenging to resolve the matter with the merchant. The payment service provider may be called upon to settle disputes, but this adds operational overhead and opens up new vectors for fraud if mechanisms for correcting incomplete transactions are corrupted. As digital payment technologies expand to more devices, participants, and communication settings, these challenges may grow.

SUMMARY

A digital transaction is secured by leveraging tamper-resistant hardware associated with at least one of the devices involved in the transaction. The mechanism that controls the transaction between a sending device and a receiving device, such as the application or an application plugin, is configured to allocate a high degree of trust to at least one of the devices with tamper-resistant hardware. This way, any confirmations and representations from the device with the tamper-resistant hardware can be trusted and locally relied upon.

A private key may be securely stored—and only known by—the tamper-resistant hardware within the user's device. The tamper-resistant device is configured with rules to prevent certain actions, such as double spending and over-spending, among other rules. Thus, so long as the funds in an account are under the exclusive control of that private key and the receiving device can verify that the sending device is configured with tamper-resistant hardware, the receiving device can trust that the sending device is acting within the confines of its prescribed rules, that the money will transfer, and that the person behind the sending device is likely authenticated. The digital transaction can execute even if there is a poor or missing network connection to the remote ledger. The sender and receiving devices can report the transaction for logging at the ledger when the network connection is reestablished. To establish that funds are under the control of a private key known only to an authentic tamper-resistant hardware device that is operating according to prescribed algorithms, a mutually trusted ledger may provide to the device a signed Spending Authorization, which the device may present to other devices. The Spending Authorization may establish parameters, such as a spending limit, and may include an expiration date.

When a network connection is subject to failure, the sending device may transfer a Revokable Payment Transaction (RPT) to the receiving device. The RPT promises the payment of a certain amount subject to sender revocation within a Revokable Term transmitted with the RPT. The receiving device transmits a confirmation to the sending device responsive to the RPT. The sending device transmits a Non-Revokable Payment Transaction (Non-RPT) responsive to receiving the receiver's confirmation. The sending device may likewise display a "PAID" on its user interface. The receiving device may report the executed transaction and Non-RPT to the ledger when the network connection is reestablished. If the sending device fails to receive the confirmation, then the sending device may generate a Revoke Payment Transaction, expose "CANCELLED" on its user interface, and report the canceled transaction to the ledger when the network connection is reestablished.

The receiving device can directly confirm the transfer of funds with the ledger when a live network connection is available while still relying on the viable communications with the sending device's tamper-resistant hardware. In this implementation, upon receiving the RPT from the sending device, the receiving device consults and confirms the RPT with the ledger. The receiving device waits to transfer the confirmation to the sending device until the ledger transaction is confirmed with the ledger. While the receiving device still trusts the sender's tamper-resistant device, the capability of verifying the transaction with the remote ledger provides additional security that is available in real-time and will ultimately be required by the sender and receiving devices anyway.

Furthermore, the sending device may precede the transmission of the RPT to the receiving device with a request for a fresh Spending Authorization from the ledger when a live connection is available. The Spending Authorization, transmitted by the ledger, provides the tamper-resistant hardware on the sending device with an updated proof of funds. This Spending Authorization may be passed through the receiving device to the ledger or independently transmitted to the ledger from the sending device.

Peer-To-Peer digital transactions can also have heightened security when the receiving device has tamper-resistant hardware rather than the sender. In this scenario, the sending device digitally signs a transaction to pay a specified amount to the receiving device and transmits the signed transaction to the receiving device over the local network used. The receiving device saves the transaction to persistent local storage and submits the transaction to the ledger, either via its live network connection or as a pass-through using the sender's live connection to the ledger. Upon the ledger executing the transfer from the sending account to the receiving account, the ledger records a reverse check that the receiving device may execute to transfer the funds back to the sending device. When the receiving device receives confirmation from the ledger that the funds have successfully transferred, the receiving device signs and saves a finalization transaction that cancels the reverse check without execution. If the receiving device fails to receive confirmation of the successful transfer of funds from the ledger, the tamper-resistant hardware signs and saves a finalization transaction that executes the reverse check and thereby refunding the sender's money. If the original transfer is never executed on the ledger, then the reverse check will not exist, so the attempt to execute it has no effect.

While network connection failures with the ledger may be rare, the security measures and configurations of the present system help prevent induced attacks by malicious actors and unintentional effects in those rare situations when network connections are lost. As the tamper resistance hardware in one or both devices in the transaction can be relied upon, the malicious actor is restricted to attempting to disrupt the network connections, both local to the other party and remote to the ledger. The configurations of the instant system enable all parties, including a malicious third party, to reach a correct and stipulated conclusion.

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Figure 1:
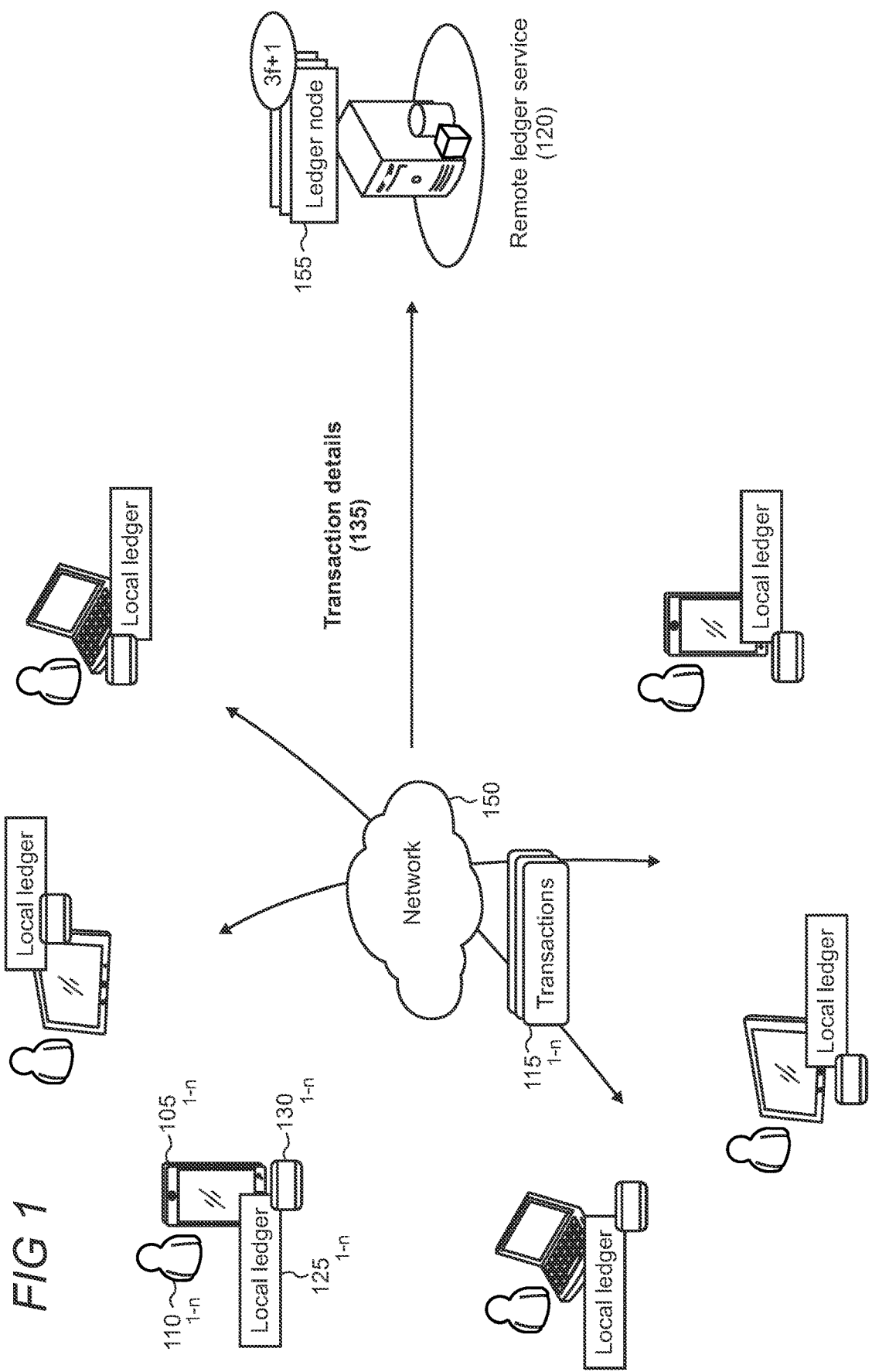
FIG. 1 shows an illustrative environment of various users executing payment transactions using a local ledger and remote ledger service.

FIG. 1 shows an illustrative environment in which multiple and distinct users 110 have their own digital wallet 130 and local ledger 125 instantiated on their respective computing devices 105 for executing transactions 115 in the form of transmitting and receiving digital payments. Each computing device may have a digital wallet from and to which digital currency is debited and credited, respectively. In this implementation, each user's computing device may have a common digital wallet application that utilizes a local ledger and the system described herein so that wallets are able to communicate with each other over the same digital transaction platform.

As described in greater detail below, a transaction between two users 110 is executed on their respective computing devices 105. Transaction 115 is executed on each local ledger, and upon completion, the respective wallets 130 for the users submit the details of the transactions 135 to a remote ledger service 120 for finalization. In some implementations, the remote ledger service may be configured using distributed ledger technology (DLT) or some other generic ledger service capable of recording the peer-to-peer transactions discussed below.

As shown in FIG. 1, for example, the remote ledger service 120 consists of multiple independent ledger nodes 155, with 3f+1 such nodes allowing for safe operation in the presence of faulty nodes. Each ledger node has a public key known to the wallets, enabling wallets to verify if a given ledger node created a message. A transaction is finalized when 2f+1 ledger nodes return a positive response. Finalization ensures that the transaction is consistent with all other transactions that have been finalized on the ledger service, i.e., each wallet can only spend funds that it has received and has not already spent. Transaction recipients can be relied upon to diligently pursue finalization, for otherwise, the value will not be credited to their account.

Figure 2:
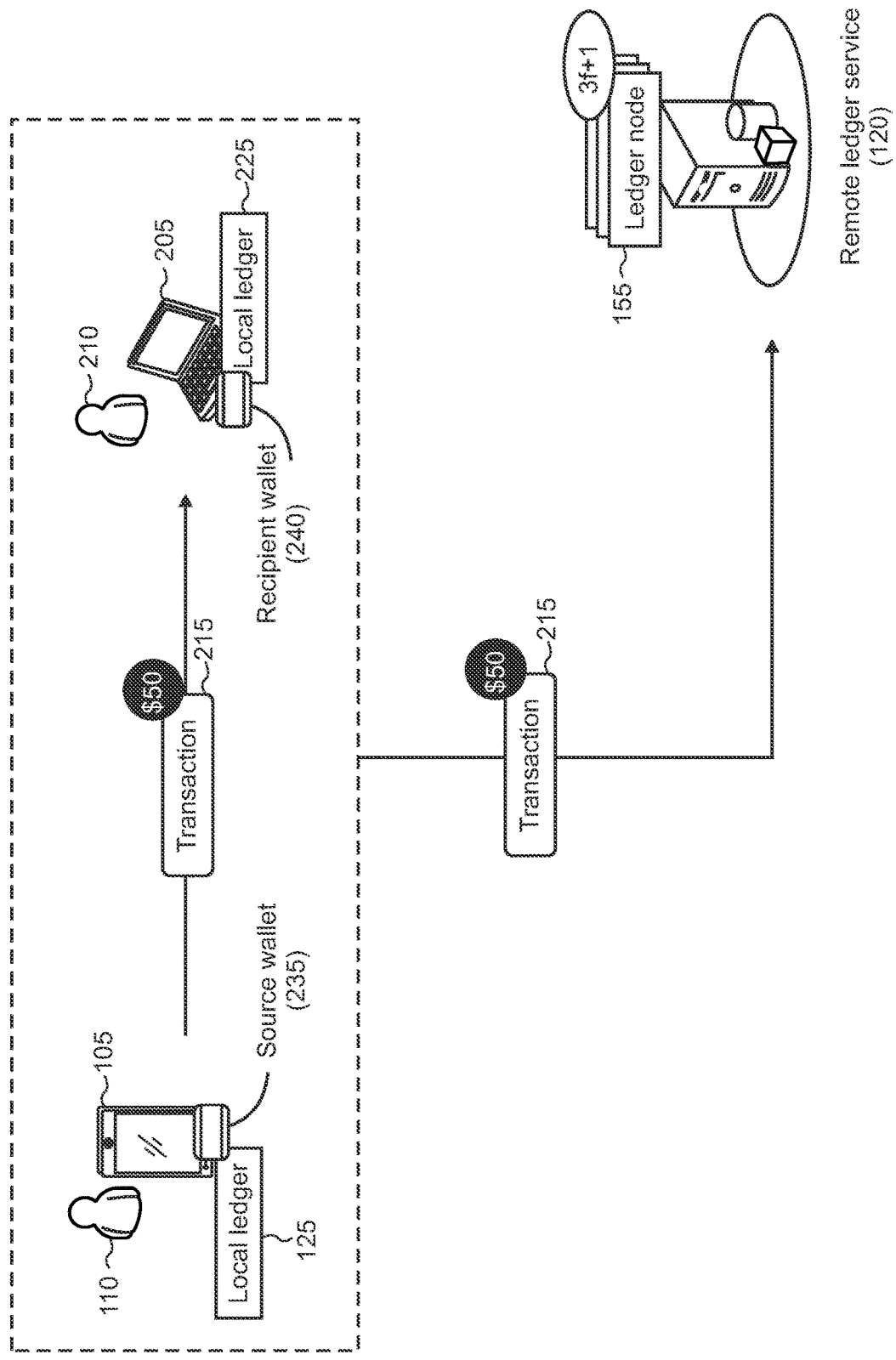
FIG. 2 shows an illustrative closed-environment in which a source wallet transmits payment to a recipient wallet.

FIG. 2 shows an exemplary transaction 215 between two users 110, 210. User 110 and device 105 are the sending user and the sending device, respectively, and user 210 and device 205 are the receiving user and the receiving device, respectively. In this example, sending user 110 transmits $50 from its source wallet 235 to the receiving wallet 240 associated with receiving computing device 205 owned by receiving user 210. The transaction may be written to each respective user's local ledger 125, 225. Once the transaction is completed locally, the source and receiving wallets associated with the users may report the transaction to the remote ledger service 120, which may be a generic ledger capable of logging these transactions or using DLT.

Figure 3:
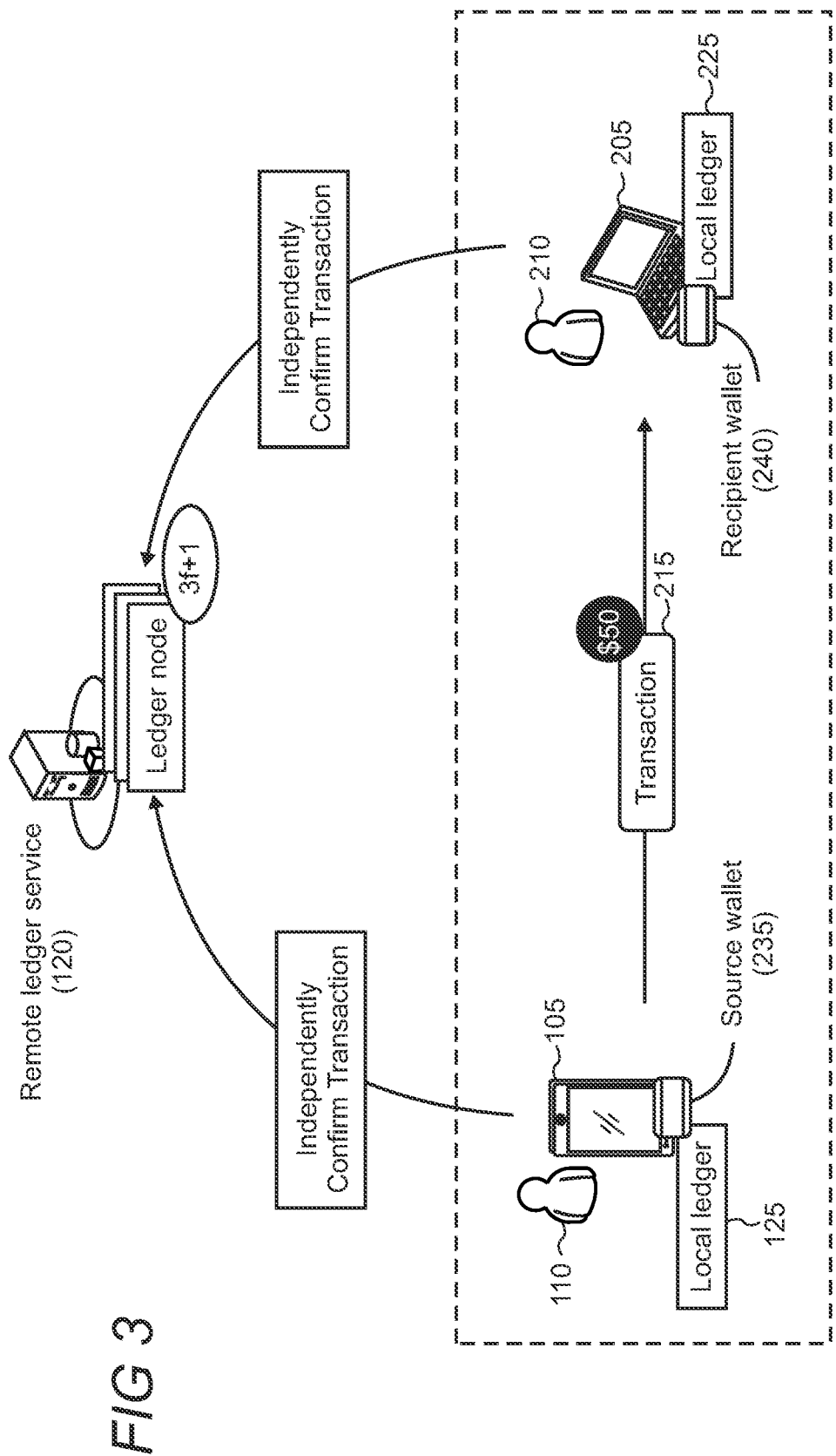
FIG. 3 shows an illustrative environment in which the transaction between the sending and receiving devices are reported to the remote ledger service.

FIG. 3 shows the exemplary transaction from FIG. 2, after which each user's wallet, the source wallet 235, and the recipient's wallet 240 independently confirm the transaction with 2f+1 ledger nodes 155 on the remote ledger service 120. Each ledger node will verify the accuracy and authenticity of the transaction for each wallet to maintain the distributed ledger's fault tolerance.

FIGS. 4-12 show illustrative representations and environments in which local devices utilize tamper-resistant hardware to enable secure and reliable transactions between the devices. The tamper-resistant hardware is leveraged to prevent a malicious actor from penetrating and/or compromising the digital monetary transaction, such as when one or both of the sending and receiving devices are offline and cannot reach the remote ledger service 120.

Figure 4:
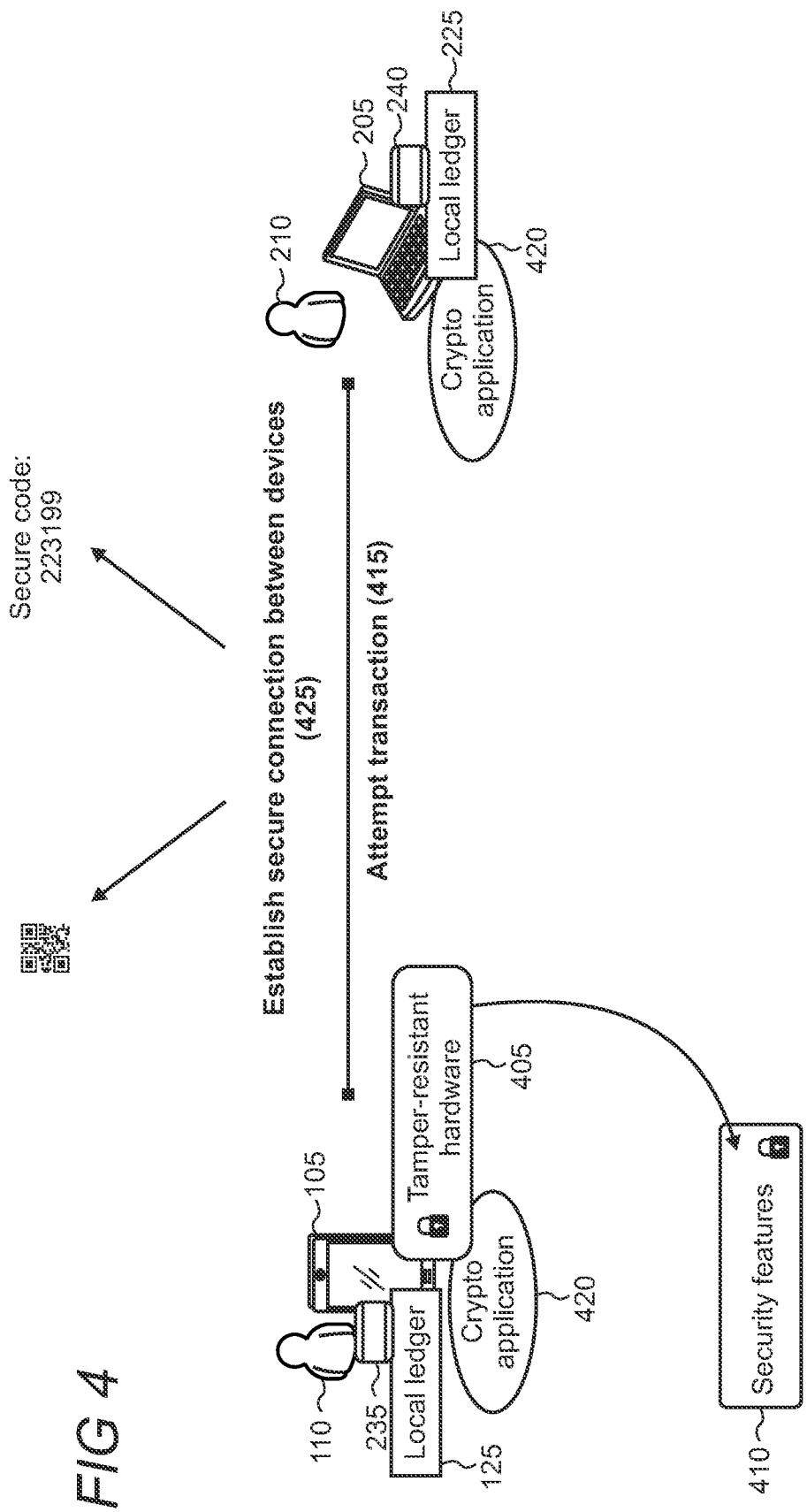
FIG. 4 shows an illustrative environment in which a sending device with tamper-resistant hardware attempts a transaction with a receiving device.

FIG. 4 shows an illustrative environment where the sending device 105 is configured with tamper-resistant hardware 405 to facilitate secure and reliable transactions. The sending device may be configured similarly as the secure tamper-resistant smart card discussed in U.S. patent application Ser. No. 16/352,657, entitled "Secure Tamper Resistant Smart Card," filed Mar. 13, 2019, such as at, but not limited to, paragraphs [0041], [0064], [0065], [0091], and [0177], among other portions of its specification and drawings, the entire contents of which is hereby incorporated herein by reference. For example, the tamper-resistant hardware can include integrating sensitive functions on a single System On a Chip (SoC) or having unclonable signatures as keys.

The tamper-resistant hardware may be considered a Trusted Platform Module (TPM) designed to provide hardware-based, security-related functions. A TPM chip is a secure crypto-processor that is designed to carry out cryptographic operations. The TPM chip may be configured to make a private key unavailable outside of the TPM, require an authorization value in order to use its private key, and prevent access after too many incorrect authorization value guesses, among other security features. Any discussion of tamper-resistant hardware herein may include any one or more of these security features and may be hardware-based or software- and hardware-based. In some implementations, purely software features may be leveraged as the tamper-resistant component. Any discussion of a sending computing device, receiving computing device, or any device configured with tamper-resistant hardware, may be considered any type of computing device, such as the smart resistant smart card in U.S. application Ser. No. 16/352,657, a laptop computer, a smartphone computer, a tablet computer, a kiosk, a point-of-sale (POS) device, a desktop computer, wearable technology (e.g., smartwatch, head-mounted display (HMD) devices), etc.

In typical implementations, before a transaction can be attempted, the sending computing device 105 and receiving computing device 205 can securely and reliably identify each other. This way, a man-in-the-middle (MITM) or other attacks cannot be performed against one or both devices. In one implementation, the tamper-resistant hardware may generate messages and signatures using internal private keys inaccessible to the rest of the computing device. Once a message is generated and signed, the sending or receiving computing device's network interface may transmit the message as it is safe from tampering, such as over Bluetooth®, Near Field Communication (NFC), Wi-Fi, cellular network, etc. Digitally signed transactions can reliably transfer funds from one account to another while being highly resistant to tampering. Before the transaction, however, it may be beneficial to validate and establish a reliable connection between the devices.

A number of methods can be used to establish a secure connection between two locally present devices, as representatively shown by numeral 425. If one of the devices has a camera and the other has a display, the second device (e.g., receiving device 205) can display a randomly generated QR code to the first device (sending device 105), and then communicate only with a device who knows the contents of the QR code. A vice versa scenario can result if the sending device displays the QR code and the receiving device scans the code. If neither device has a camera or the camera is otherwise not a desirable option, but both have displays or other output devices (e.g., displays on a peripheral device like a smartwatch), the devices can be confident they are communicating with each other by displaying and comparing a common code generated by secure cryptographic methods. For example, a Diffie-Hellman key exchange can be used to establish a secure connection by exchanging public keys, and then a short hash of the two public keys can be displayed on each device to confirm that each device is using the same pair of keys. Once the end-point has been reliably identified, subsequent communications can be secured by Authenticated Encryption methods, which provide both confidentiality and integrity of messages. Alternatively, one device may generate the code that the other user operating the opposing device can enter into their device's input mechanism to establish a reliable connection. Essentially, some initial authentication between the devices can be performed to securely identify each other and then leverage the tamper-resistant hardware for the transaction.

Figure 5:
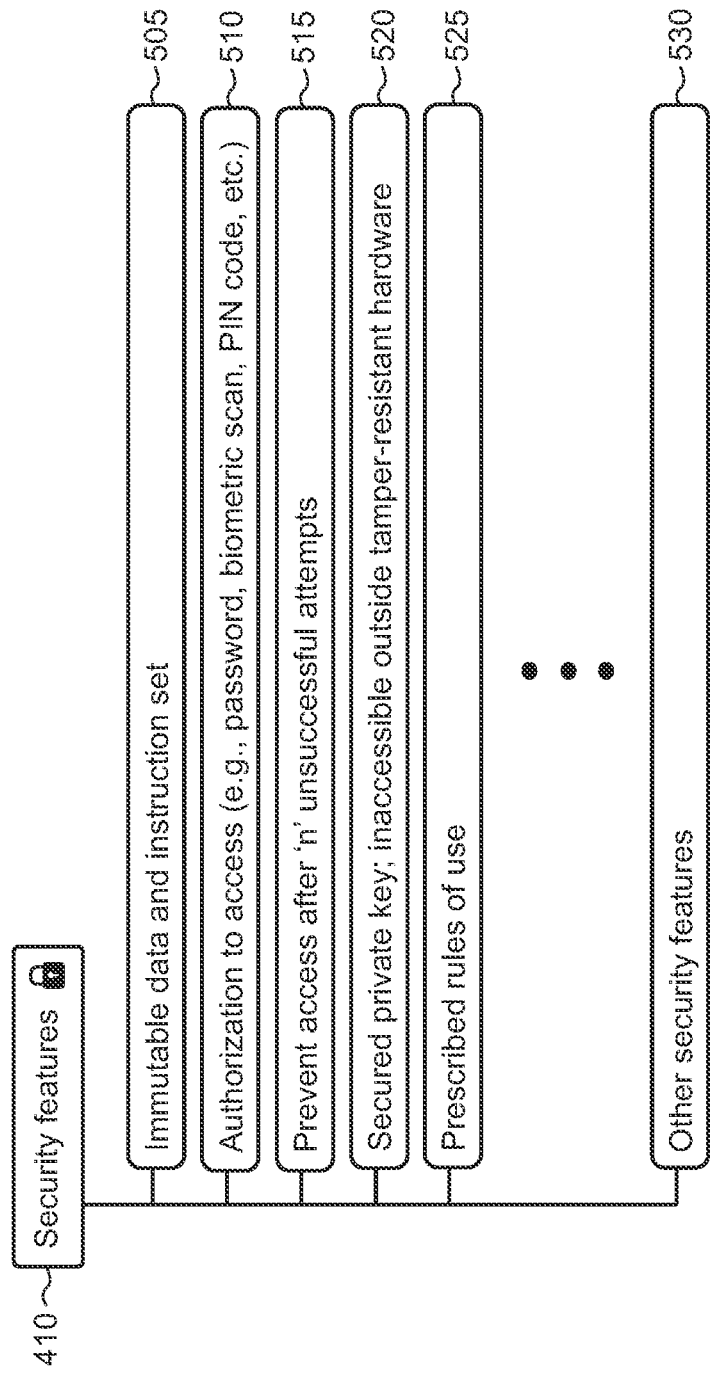
FIG. 5 shows an illustrative schema of security features associated with tamper-resistant hardware.

As shown in FIG. 4, the tamper-resistant hardware is configured with various security features 410. FIG. 5 shows an illustrative and non-exhaustive schema of security features 410 that may be associated with tamper-resistant hardware 405. Security features can include immutable data and instruction set 505, authorization to access (e.g., password, biometric scan, PIN (personal identification number) code, etc.) 510, prevent access after 'n' (e.g., three, four, etc.) unsuccessful attempts 515, secured private key; inaccessible outside tamper-resistant hardware 520, prescribed rules of use 525, and other security features 530.

The sending device 105 and receiving device 205 are each configured with a crypto application 420 that is locally executing. The crypto application may be a standalone application installed on the device, or alternatively may be a plugin installed in another application. In FIG. 4, the users are attempting to execute a transaction between them, as representatively shown by numeral 415. For example, the sending user 105 may be attempting to send digital currency to receiving user 210 in exchange for goods or services. The receiving user may be a brick and mortar store that sells goods, such as groceries, personal care items, etc., or may be a service provider, such as window cleaning, auto repair services, etc. The specific offering of goods or services is not pertinent to the system's overall execution, rather, the relevancy is that the sending user intends to pay the receiving user for some good or service.

Figure 10:
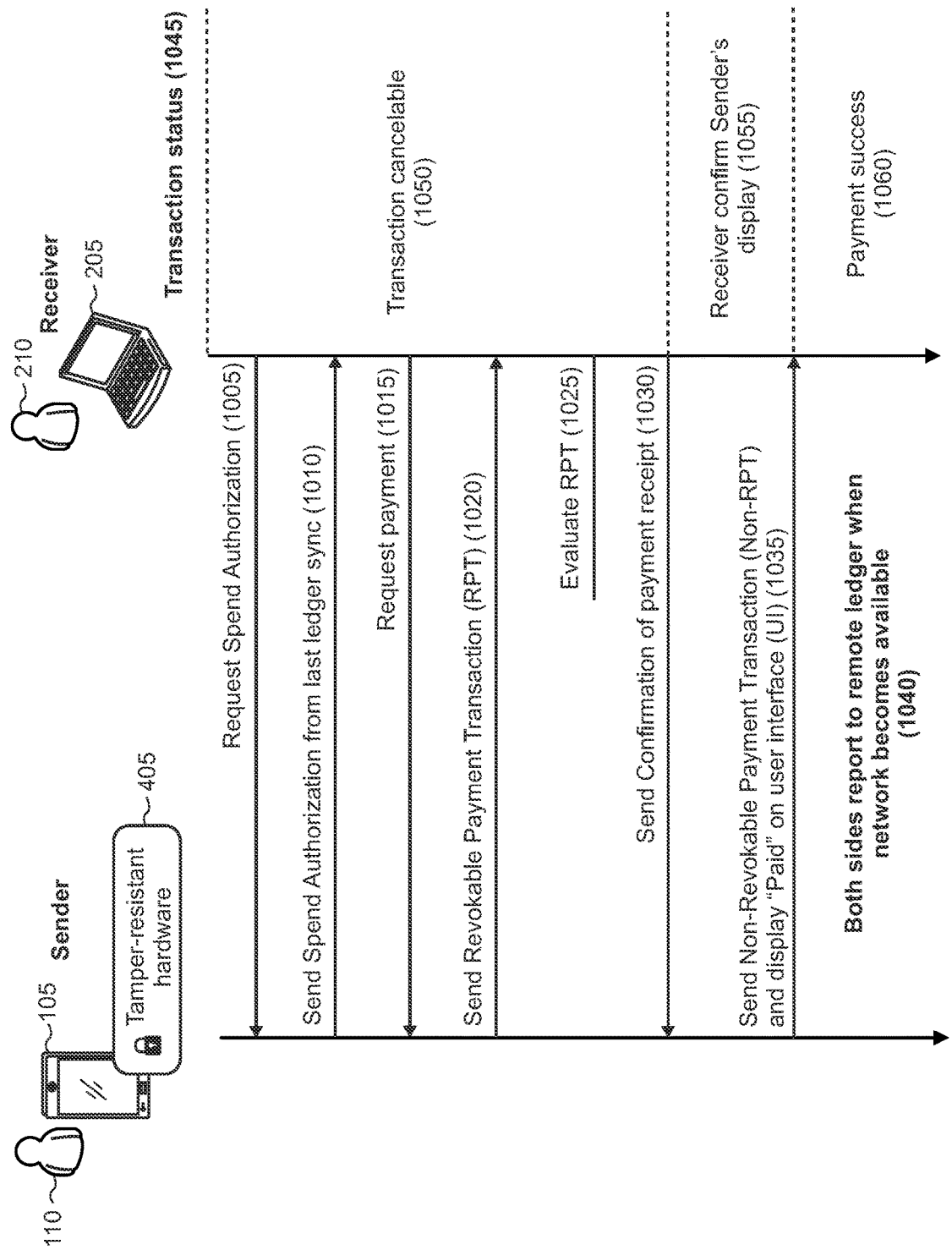
FIG. 10 shows a flow diagram of a transaction for an off-network payment protocol.
Figure 11:
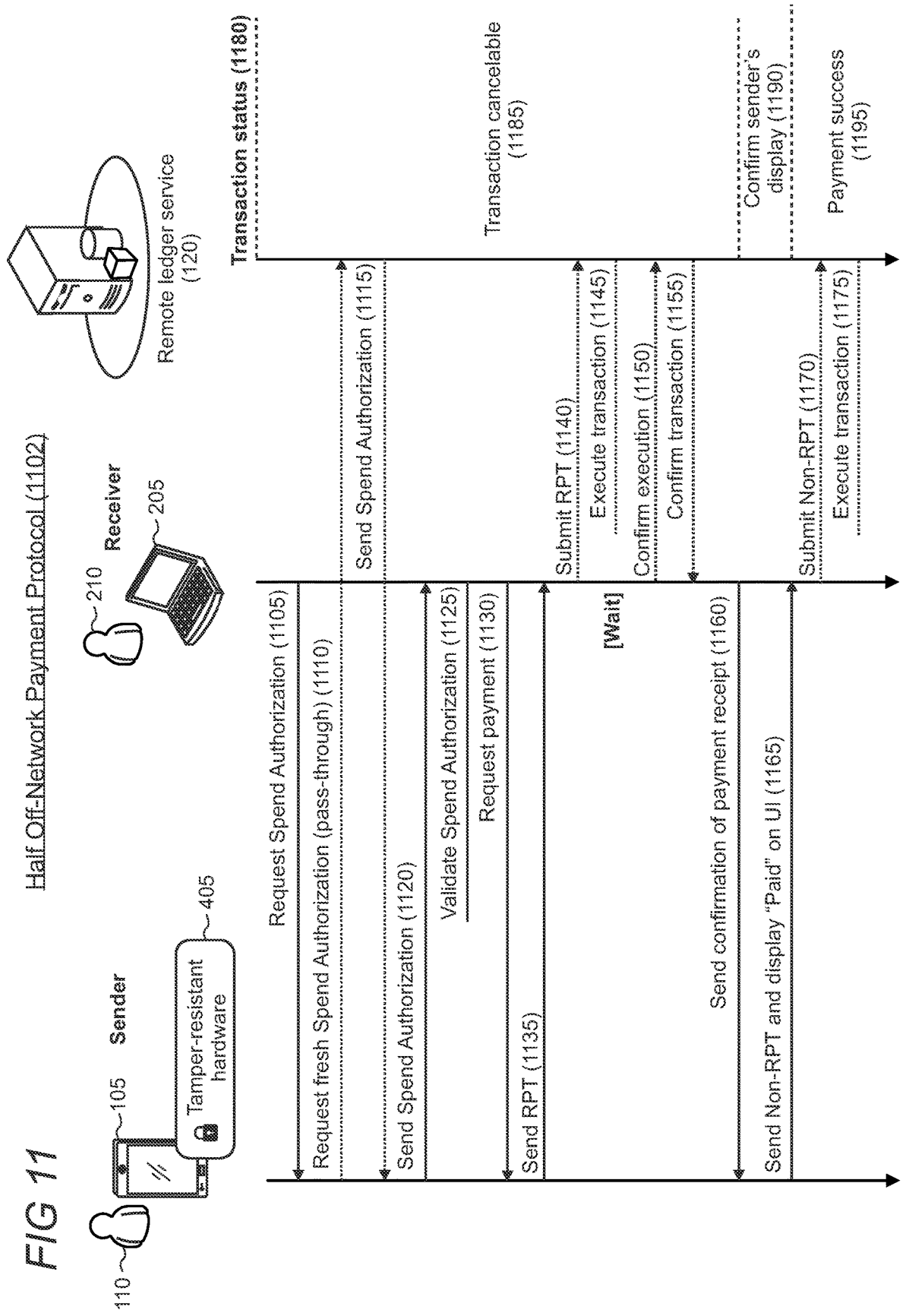
FIG. 11 shows a flow diagram of a transaction for a half off-network payment protocol.
Figure 12:
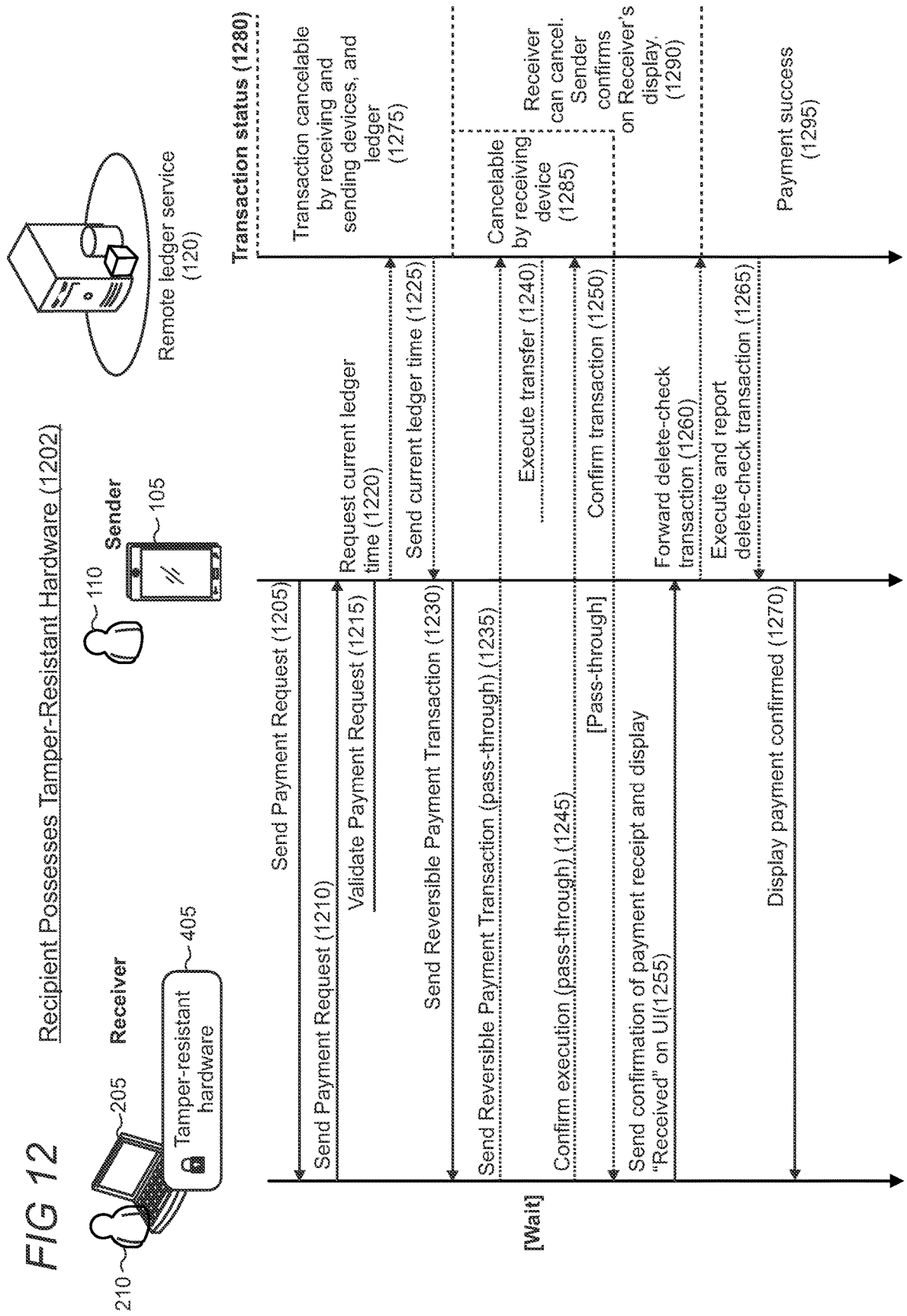
FIG. 12 shows a flow diagram of a transaction in which the receiving device possesses the tamper-resistant hardware.

FIGS. 6-9 show high-level environments several ordered steps of an exemplary transaction but may not include all of the steps. Further clarification and steps may be included in a transaction depending on the specific circumstances of the transaction, as shown in FIGS. 10-12.

Figure 6:
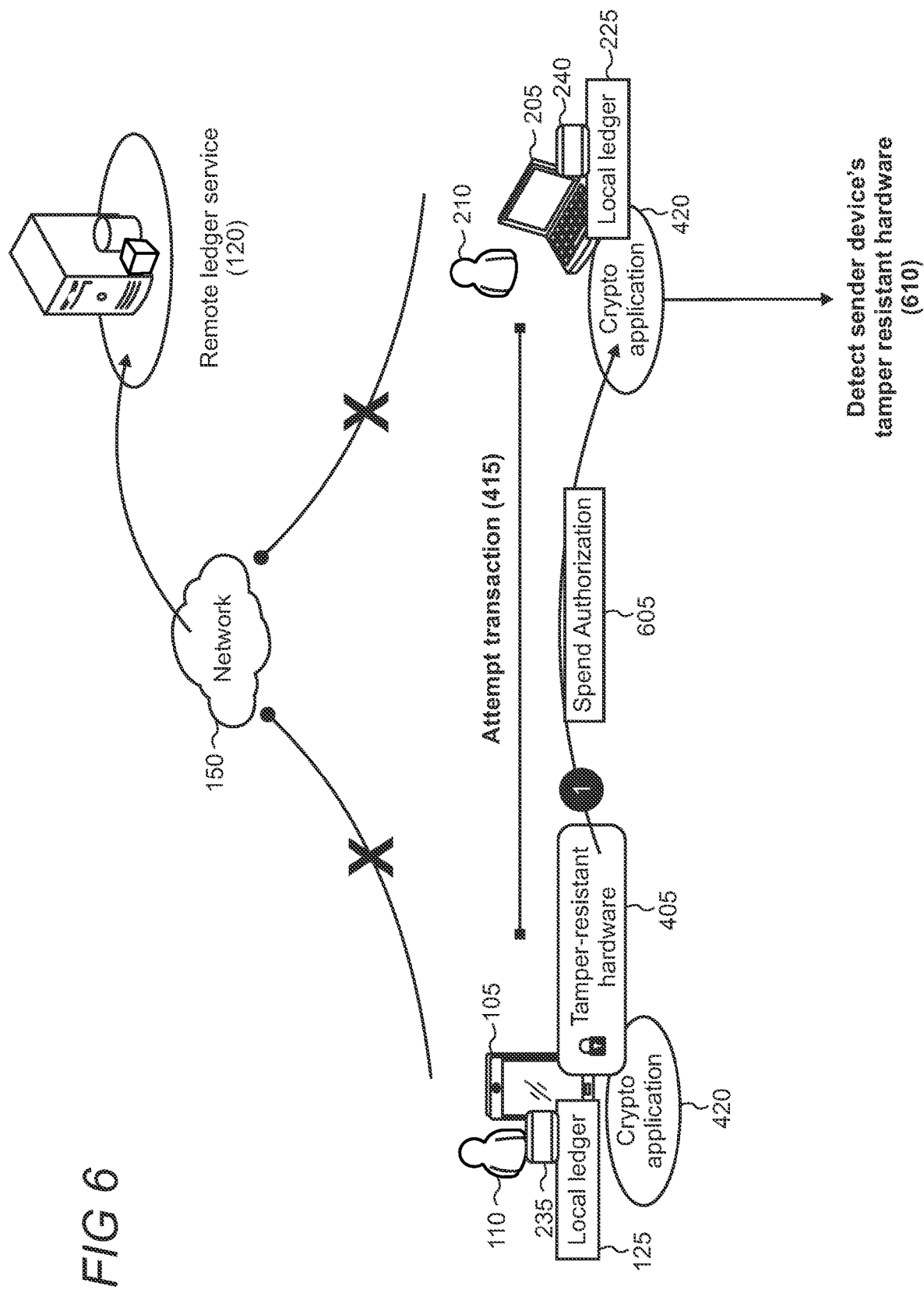
FIG. 6 shows an illustrative environment in which there is a network failure with the remote ledger service.

FIG. 6 shows an illustrative representation in which both the sending device 105 and the receiving device 205 have a network failure and cannot communicate with the remote ledger service 120. The receiving device's crypto application 420 is able to identify that the sending device is configured with tamper-resistant hardware 405, as representatively shown by numeral 610. This detection may be done, for example, when the sending device's tamper-resistant hardware transmits the Spend Authorization 605, which is a message that is signed by a mutually trusted bank. The bank may be some banking institution or company that holds the digital currency for the user. In this regard, the bank has a strong incentive to regulate its user base and prevent and vet out any corruption. The bank makes the judgment that the tamper-resistant hardware is satisfactory when they enable the user's account. The bank may also stop issuing Spend Authorizations to the tamper-resistant device if the account exhibits corrupt or otherwise unordinary behavior. Discussion of the Spend Authorization is discussed in greater detail below.

The bank judgment is based on a certificate signed by the device manufacturer who created the tamper-resistant hardware. The device presents this certificate to the bank during account activation so that the tamper-resistant hardware is approved before any transactions are ever attempted.

Figure 7:
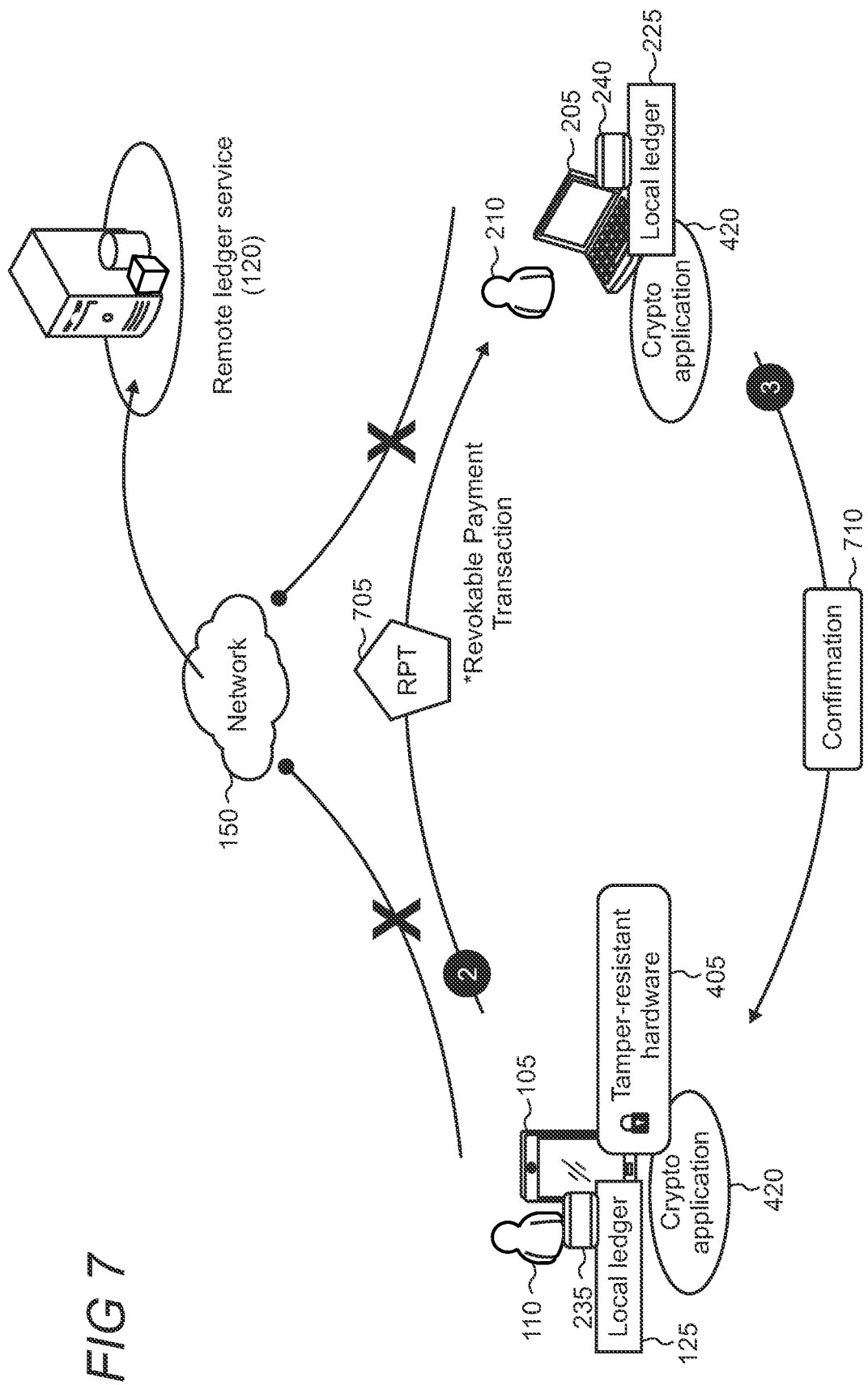
FIG. 7 shows an illustrative environment in which the sending device transmits a Revokable Payment Transaction (RPT) to the receiving device.

FIG. 7 shows an illustrative representation in which the sending device transmits a Revokable Payment Transaction (RPT) 705 to the receiving device 205 after the tamper-resistant hardware has been detected (FIG. 6). In this scenario, the sending device 105 and receiving device 205 do not have active network connections to the remote ledger service 120 but can still execute a trustworthy transaction using the tamper-resistant hardware 405. The tamper-resistant hardware transmits the RPT to the receiving device. The RPT may include, for example, a promise to pay a given amount (e.g., $50 of digital currency) that the sender 110 or sending device 105 can revoke within a revokable term, which is some predetermined time interval. Depending on the situation and system configuration, the revokable term can be minutes, hours, or days. In typical implementations, the revokable term may be five days to enable sync up with the remote ledger service.

The receiving device 205 transmits a Confirmation 710 to the sending device 105 responsively to receiving the RPT. Upon receipt of the Confirmation message, the sending device considers the transaction final and irrevocable, though still requiring execution on the ledger.

Figure 8:
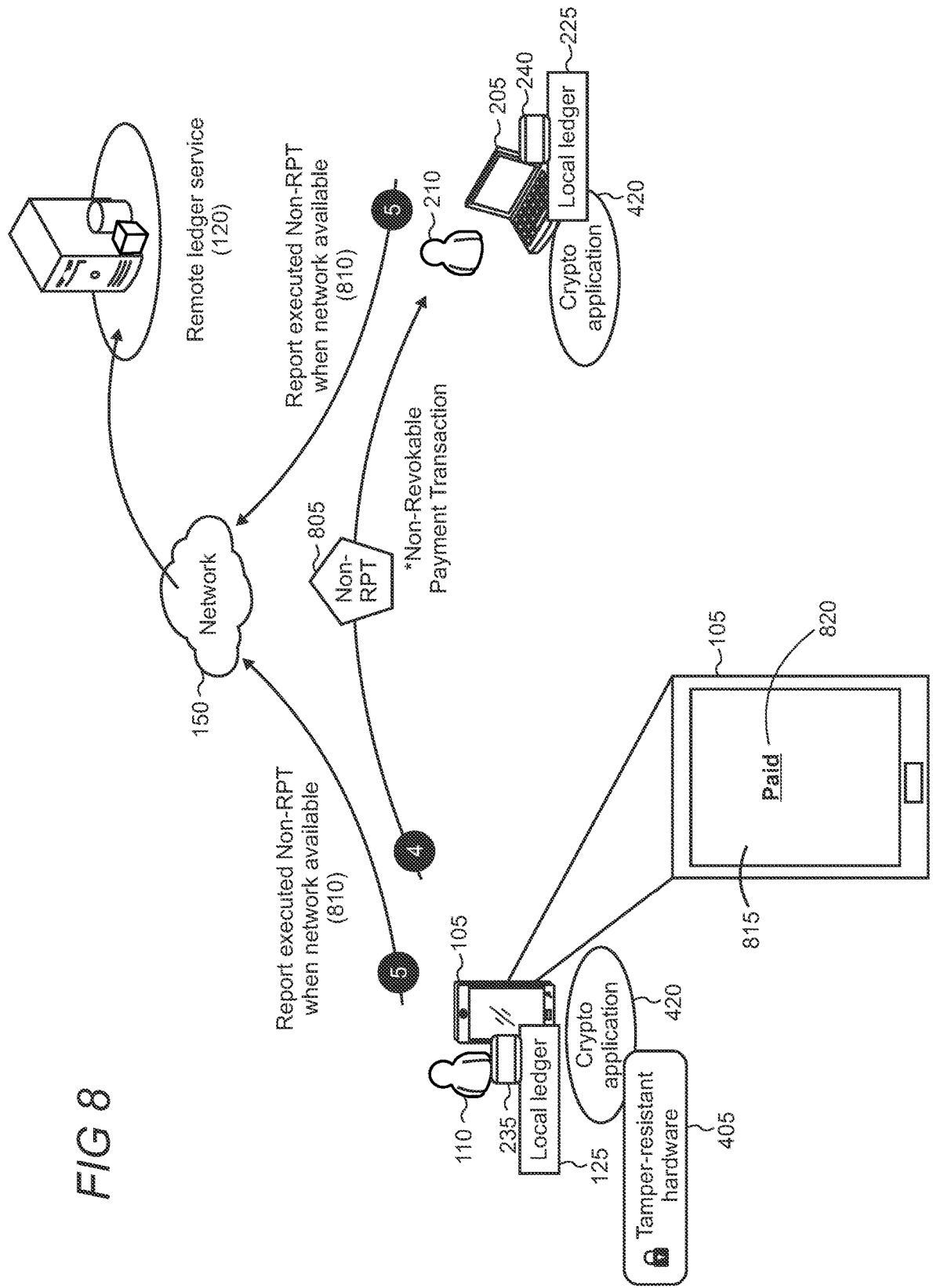
FIG. 8 shows an illustrative environment in which the sending device transmits a Non-RPT to the receiving device and displays "Paid" on its user interface after receiving confirmation from the receiving device.

FIG. 8 shows an illustrative environment where, responsively to receiving the confirmation, the sending device transmits a Non-Revokable Payment Transaction (Non-RPT) 805 to the receiving device 205. The Non-RPT describes the same payment amount to the receiving device and indicates to the receiving device that the sending device can no longer revoke the transaction. Simultaneously with the transmission of the Non-RPT, before transmitting the Non-RPT, or after transmitting the Non-RPT, the sending device also displays a "Paid" 820 message on its computing device's display 815. The displayed message may be words, symbols, graphics, artwork, icons, or alternatively, may be a sound that is triggered that represents a positive outcome.

When the sending device 105 and receiving device 205 regain their network connection, one or both of the devices can report the Non-RPT to the remote ledger service 120, as representatively shown by numerals 810. Or, in the case where the Non-RPT did not arrive at the receiving device, it can report the RPT to the remote ledger service. This will insure that funds will transfer even if the sending device is lost or otherwise fails to report the Non-RPT in a timely manner.

In typical implementations, the transaction can be canceled by the sending device 105 anytime until the Non-RPT is transmitted or until the sending device receives the confirmation. Once the confirmation is received, the sending device may consider the transaction final and perform operations as such. After the receiving device transmits the confirmation to the sending device, a prompt may show up on the receiving device that tells the receiving user to check the sending user's display for some "Paid" or "Cancelled" message. This may occur in case the Non-RPT is not received at the receiving device, and therefore, the receiving device is not sure whether the transaction was executed. Reviewing the device's display with tamper-resistant hardware can be a safe and secure mechanism for the non-tamper-resistant device user to verify the transaction executed.

Figure 9:
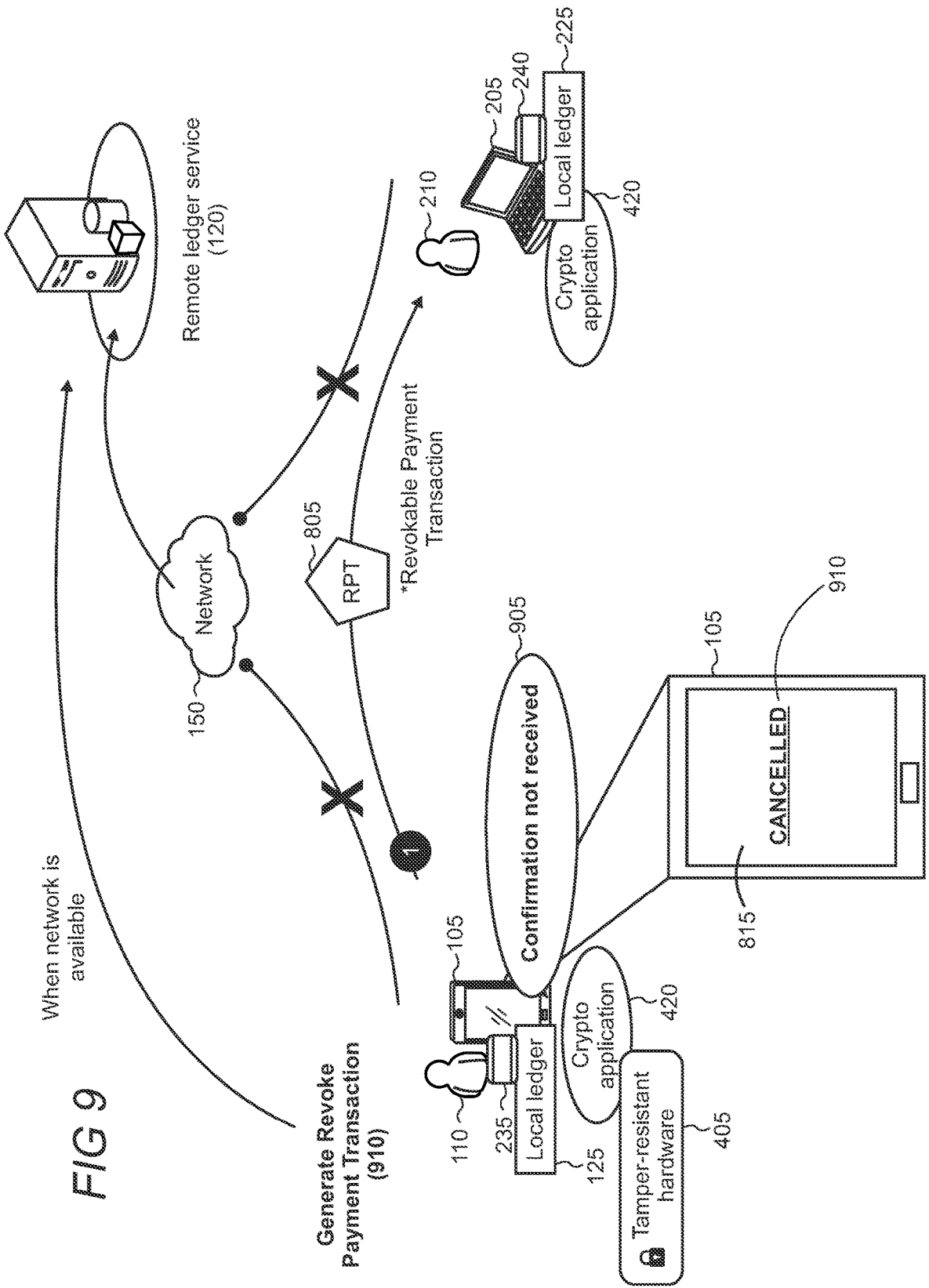
FIG. 9 shows an illustrative environment in which the sending device cancels the transaction and display "Cancelled" on its UI after failing to receive the receiving device's confirmation.

FIG. 9 shows an illustrative environment in which the confirmation was not received by the sending device, as representatively shown by numeral 905. Responsively, the sending device displays "Cancelled" 910 on its user display 815. The "Cancelled" message indicates to both parties that the transaction was not executed, and a Revoke Payment Transaction 910 will be reported as such to the remote ledger service 120 when the network becomes available again. The Revoke Payment Transaction is generated responsively to the canceled transaction and saved until the network is available.

FIGS. 10-11 show illustrative flow diagrams of distinct payment protocols that utilize overlapping techniques and leverage specific configurations and transmission protocols to safeguard the viability and trustworthiness of the transactions. Each embodiment leverages the tamper-resistant hardware associated with at least one of the computing devices to facilitate the transaction's viability. While only one device is shown with tamper-resistant hardware, in other implementations, each device may be configured with tamper-resistant hardware. Furthermore, tamper-resistant hardware is the component generating the various communications for a given device, such as the sending computing device in FIGS. 10 and 11 and the receiving computing device in FIG. 12.

The tamper-resistant hardware may generate messages and signatures using internal private keys inaccessible to the rest of the computing device. Once a message is generated and signed, the sending or receiving computing device's network interface may transmit the message as it is safe from tampering, such as over Bluetooth®, Near Field Communication (NFC), Wi-Fi, cellular network, etc. Digitally signed transactions can reliably transfer funds from one account to another while being highly resistant to tampering. However, this presumes that the sender and receiver accounts specified by the transactions have been correctly identified. Accounts read from a network connection can only be trusted if the other end of the network connection is securely associated with the correct device.

A number of methods can be used to establish a secure connection between two locally present devices. If one of the devices has a camera and the other has a display, the second device can display a randomly generated QR code to first device, and then communicate only with a device who knows the contents of the QR code. If neither device has a camera, but both have displays, they can be certain they are communicating with each other by displaying and comparing a common code generated by secure cryptographic methods. Once the end-point has been reliably identified, subsequent communications can be secured by Authenticated Encryption methods, which provide both confidentiality and integrity of messages. Essentially, some initial authentication between the devices can be performed so that the devices can securely identify each other.

FIG. 10 shows an illustrative flow diagram of an off-network payment protocol 1002, which shows additional details and steps about the transaction described in FIGS. 6-9. The right side column, transaction status 1045, shows the transaction status from a connection failure handling perspective. Meaning whether the transaction is cancelable 1050 if a failure occurs at that stage in the process, whether the sender and receiver are in an intermediate state in which the receiver should confirm with the sender's display 1055," or whether the payment was a success 1060.

In step 1005, the receiving device 205 requests a Spend Authorization from the sending device 105. The request may include identifying the payment provider and specifies an offline mode since there is no presently available network connection to the ledger. Selection of the offline mode means that all communications will be local to the two devices, so should generally complete quickly or not at all. Thus, shorter timeout parameters are used than in the online mode where time finalizing transactions on a remote ledger takes additional time. In step 1010, the tamper-resistant hardware at the sending device sends the Spend Authorization from its last ledger sync. The Spend Authorization includes an indication that the sending device is configured with tamper-resistant hardware that was previously approved by a mutually trusted bank or financial institution that provides user accounts. The Spend Authorization provides sufficient security to the receiving device since the bank can revoke the Spend Authorization if the bank detects corrupt or unordinary behavior, such as intentionally attempting to overdraw an account, tampering with the device's hardware, etc.

The receiving device may evaluate the payment provider's signature on the Spend Authorization, the expiration period for the Spend Authorization, and the amount limit. If the payment provider's signature matches with some payment provider public key stored at the receiving device, the Spend Authorization has not expired, and the amount limit is not lower than the desired payment for the instant transaction, then the receiving device may transmit a request for payment to the sending device.

In step 1015, the receiving device 205 transmits a request payment message to the sending device, responsive to receiving and evaluating the Spend Authorization. The request payment message includes a payment amount for the transaction and an incremented recipient sequence number. When returned back in the payment transaction, the recipient sequence number allows the recipient to identify the payment as a newly generated one, not a replay of a previous payment.

In step 1020, the tamper-resistant hardware 405 at the sending computing device transmits a Revokable Payment Transaction (RPT) to the receiving device and saves the RPT in persistent storage. Persistent storage herein may refer to non-volatile storage, such as flash storage, hard disk, optical media, or other devices that retain data after switching off the device. The RPT includes the amount from the requested payment and a revokable term over which the sender can revoke the transaction. The revokable term begins when the receiving device submits the transaction to the remote ledger service 120. The recipient sequence number prevents the replay of previous payments.

In step 1025, the receiving device 205 evaluates the RPT. Evaluation of the RPT includes the sending device's signature, consistency of the RPT with the Spend Authorization, and consistency of the RPT with the Payment Request. Upon acceptance, the receiving device saves the RPT in persistent storage.

In step 1030, the receiving device transmits a Confirmation to the sending device. At this stage, the sending device can revoke the transaction if the confirmation is not received. The transaction is cancelable until the tamper-resistant hardware 405 at the sending computing device receives the confirmation and proceeds with its next steps. Should the confirmation not be received within a predetermined time interval, the sending device submits a Revoke Payment Transaction to the remote service ledger when a network connection becomes available.

In step 1035, the tamper-resistant hardware 405 at the sending computing device transmits a Non-Revokable Payment Transaction (Non-RPT) to the receiving device and displays "Paid" on its user interface (UI) for the receiver's confirmation. Receipt of the Non-RPT indicates to the receiving device that the transaction was locally executed. The receiver can confirm that the transaction was executed at the sending device by reviewing the "Paid" screen, regardless of whether the Non-RPT was received due to some local network connection failure over Bluetooth®, Near-Field Communication (NFC), Wi-Fi, etc. As shown in the transaction status 1045 column, the receiver can confirm the application's status by viewing the sender's display.

The receiving device evaluates the Non-RPT upon receipt. The receiving device verifies the consistency of the Non-RPT with the RPT, the sending device's signature, saves the Non-RPT to persistent storage, and discards the RPT. In step 1040, one or both of the sending device 105 or the receiving device 205 can report the Non-RPT and the executed transaction to the remote ledger when the network becomes available. The payment is a success at this stage, as representatively shown by numeral 1060, and is no longer cancelable. If the receiving device does not receive the Non-RPT, it will submit the RPT when the remote ledger next becomes available. Submitting the RPT ensures that funds will transfer, as long as the sending device does not submit a Revoke Payment transaction before the revokable term expires. When funds are transferred by an RPT, the ledger may place them in a held state, not available for spending until the revokable term expires.

FIG. 11 shows an illustrative flow diagram of a half off-network payment protocol 1102 transaction between the sending device 105 and receiving device 205. In this scenario, the receiving device has an operable network connection with the remote ledger service 120, and the sending device does not.

In step 1105, the receiving device 205 sends a Spend Authorization request to the sending device. The Spend Authorization request includes a request to identify the payment provider and an indication that the transaction will be in an "online mode" since the receiving device has a live connection. Note the contrast from the off-network payment protocol 1002 in FIG. 10, in which the receiving device indicates an offline mode.

In step 1110, the tamper-resistant hardware 405 at the sending computing device transmits a request for a fresh Spend Authorization to the remote ledger service 120 responsive to the received request from the receiving device.

The Spend Authorization request is encrypted and passes through to the receiving device to the remote ledger service 120. Specifically, the pass-through communication may be transmitted using some local connection to the receiving device, and then the receiving device uses its established Wide Area Network (WAN) connection to transmit the Spend Authorization request to the remote ledger. The pass-through Spend Authorization request enables the tamper-resistant hardware 405 at the sending computing device to receive a current ledger timestamp for its account and submit any outstanding transactions.

In step 1115, the remote ledger service 120 transmits the fresh Spend Authorization as a pass-through communication to the tamper-resistant hardware 405 at the sending computing device 105. The remote ledger service executes any outstanding transactions and, provided that the account remains in good standing, transmits the encrypted Spend Authorization, which details the sender's current ledger time stamp, expiration, and spending limits. The Spend authorization can be deciphered using the tamper-resistant hardware 405 at the sending device 105. The sending device stores the Spending Authorization in persistent storage for future transactions that may be performed offline.

In step 11120, the tamper-resistant hardware 405 at the sending computing device 105 transmits the Spend authorization to the receiving device. The Spend Authorization includes a spending limit, an expiration for the Spend Authorization, and the payment provider's signature, which validates the sending device's tamper-resistant hardware. In step 1125, the receiving device evaluates the Spend Authorization by reviewing the information therein. Upon validation, in step 1130, the receiving device transmits the payment request to the sending device. The payment request includes an amount for the transaction and an incremented recipient sequence number identifying the receiving device's specific transaction.

In step 1135, the tamper-resistant hardware 405 at the sending computing device transmits an RPT to the receiving device and saves the RPT in persistent storage. The RPT includes the amount from the requested payment and a revokable term over which the sender can revoke the transaction. In this scenario, the revokable term may last seconds or minutes, depending on the implementation. Since there is a live connection to the remote ledger, the revokable term may last one minute to receive confirmation from the receiving device. The revokable term begins when the receiving device submits the transaction to the remote ledger service 120. The recipient sequence number prevents the replay of previous payments.

In step 1140, the receiving device transmits the RPT to the remote ledger service 120. In step 1145, the remote ledger service executes the transaction by transferring funds from the sender's account to the receiver's account. The remote ledger service verifies the transaction by waiting for consensus with other nodes. In step 1150, the receiving device may confirm the execution of the transaction with the remote ledger service. This confirmation step may occur, for example, if it is still waiting for confirmation from the remote ledger. In step 1155, the remote ledger service confirms the execution of the transaction with the receiving device.

In step 1160, the receiving device transmits a confirmation of payment receipt to the tamper-resistant hardware 405 at the sending computing device. In step 1165, the tamper-resistant hardware 405 at the sending computing device transmits a Non-RPT to the receiving device and displays a "Paid" or similar connotation on its UI.

As shown in the transaction status 1180 column, the transaction was cancelable anytime up until the sending device receives the confirmation, transmits the Non-RPT, and displays the "Paid" representation. In this regard, the transaction may be cancelable anytime before the sending device processes the receiving device's confirmation. The receiving device can confirm the execution of the transaction after confirmation is transmitted by reviewing the sender's display 1190 or by receiving the Non-RPT.

Upon receiving the Non-RPT, the transaction status is considered a "Payment success" 1195. In step 1170, the receiving device submits the Non-RPT to the remote ledger service 120. In step 1175, the remote ledger service executes the transaction against the receiving device's account.

FIG. 12 shows an illustrative flow diagram for a scenario in which the receiving device possesses the tamper-resistant hardware 1202 instead of the sending device, as in FIGS. 10 and 11. Like the other scenarios, the device with tamper-resistant hardware is considered trusted and thus has the authority to revoke a transaction, which it can exercise until the transaction is viably executed.

In step 1205, the sending device 105 sends a payment request to the receiving device 105. The payment request may include a monetary amount for the transaction. In step 1210, the receiving device transmits the Payment Request to the sending device. The Payment Request includes a Spend Authorization from a prior ledger sync to prove the receiving device's tamper-resistant hardware is trusted to correctly use the revoke power granted to it. The Payment Request may also include the recipient sequence number to allow the recipient to easily identify that the payment is new.

In step 1215, the sending device 105 validates the Spend Authorization to verify the tamper-resistant hardware of the receiving device. In step 1220, the sending device sends a request for a current ledger time from the remote ledger service 120. In step 1225, the remote ledger service sends the current ledger time to the sending device. In step 1230, the sending device transmits a Reversible Payment Transaction (Rev-PT) to the receiving device. The Rev-PT is distinct from the RPT in that the receiver has the power to revoke in the former, while the sender has the power in the latter. The Rev-PT includes the recipient's sequence number from the payment request in step 1210, and includes an expiration period, such as 20 seconds. The receiving device confirms the recipient sequence number and saves the Rev-PT to persistent storage. In step 1235, the tamper-resistant hardware at the receiving device transmits the Rev-PT to the remote ledger service as a pass-through communication.

In step 1240, the remote ledger service executes the transaction responsively to receiving the pass through Rev-PT from the receiving device 205. The receiving device waits the period identified in the Rev-PT from the sending device, such as 20 seconds. The ledger may record a reverse check, which records the amount, date, and sender of the transfer, allowing the receiving device to refund the money if they fail to receive confirmation that the transfer completed. If the tamper-resistant hardware at the receiving device does not receive an immediate error from the remote ledger, the tamper-resistant hardware waits a period of time for the ledger to finalize the transaction, then transmits a confirm execution query as a pass-through to the remote ledger service in step 1245. In step 1250, the remote ledger service confirms the transaction's execution as a pass-through communication to the tamper-resistant hardware at the receiving device. Upon receiving the pass-through confirmation from the remote ledger, the tamper-resistant hardware at the receiving device considers the transaction executed and is no longer cancelable. The receiving device finalizes the transaction and creates a delete-check transaction to delete the reverse check recorded on the ledger. If confirmation from the remote ledger fails to arrive within a predetermined timeout, the receiver creates a refund transaction to execute the check on the remote ledger and return the funds to the sender. If the funds were not transferred in the first place, then the check will not exist on the ledger, so no refund will occur.

In step 1255, the tamper-resistant hardware at the receiving device sends the delete-check transaction as confirmation of payment receipt and displays "Received" on its UI. From the sending device's prior direct and deliberate transmittal in step 1230 until the receipt of the confirmation and/or the exposure of "Received" on the receiving device's UI, the sender is in an intermediate state and relies on the receiving device's display for confirmation. The receiving device's display may provide status updates of each passthrough communication throughout the pendency of the transaction to alert both parties to know of the status.

In step 1260, the sending device 105 forwards a delete-check transaction to the remote ledger service 120. In step 1265, the remote ledger service executes and reports the delete-check transaction to the sending device. In step 1270, the sending device displays that the payment is confirmed, which can be verified by the receiver by viewing the sender's display. Or, in the case where the ledger confirmation failed to arrive, the receiving device will forward the refund transaction, which the sender can execute to regain access to the funds.

Referring to the transaction status 1280 column, the connection failure handling varies depending on which party is communicating. For example, the transaction may be canceled by the receiving device 205, sending device 105, or the remote ledger service 120 up until the sender sends the Rev-PT in step 1230, as representatively shown by numeral 1275. The transaction may be canceled by the receiving device or the sender should confirm the transaction's execution on the receiver's display up until the receiving device receives the confirmation from the remote ledger service in step 1250, as representatively shown by numeral 1290. The payment is considered a success for all parties when the remote ledger service receives the delete-check transaction in step 1260, as representatively shown by numeral 1295. The variances in areas 1285 and 1290 are due to the different parties involved at points in the transaction.

In FIGS. 10-12, the transaction can be canceled at any point as shown in the status columns on the right sides of the flow diagrams. The cancellations may occur, for example, if a communication is lost at any point in time during the cancelation window. For example, in FIG. 10, in communications 1005, 1010, 1015, 1020, and 1025, both the sending and receiving devices may consider the transaction canceled if any of those communications are lost or not responded to. The periods at which one party submitted a confirmation, such as steps 1030 in FIG. 10, 1160 in FIG. 11, and 1230 in FIG. 12, are when that one party is in an intermediate state and can confirm on the tamper-resistant hardware's display to confirm the transaction, at least until a Non-RPT (FIGS. 10 and 11) or delete-check (FIG. 12) is received. Throughout this intermediate state, status updates may be displayed on the tamper-resistant device's user interface to keep both parties approved of the transaction's progression. The updates may include, for example, the specific communication that was most presently received or communicated as shown in the drawings or discussed herein in reference to the drawings.

Figure 13:
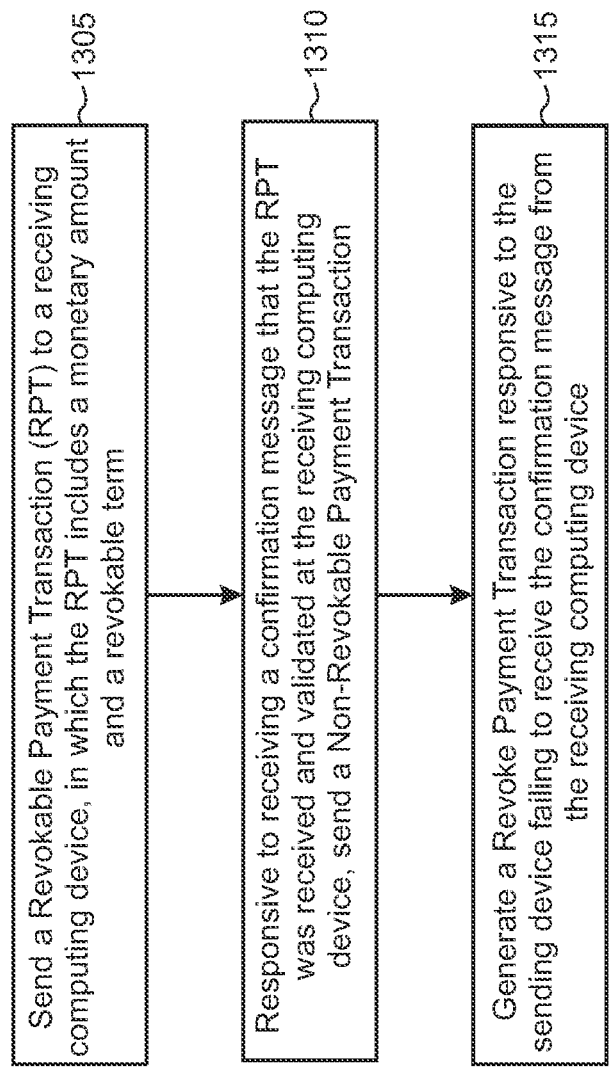
FIGS. 13 and 14 show illustrative flowcharts of the system that leverages tamper-resistant hardware to transfer digital currency between local devices.
Figure 14:
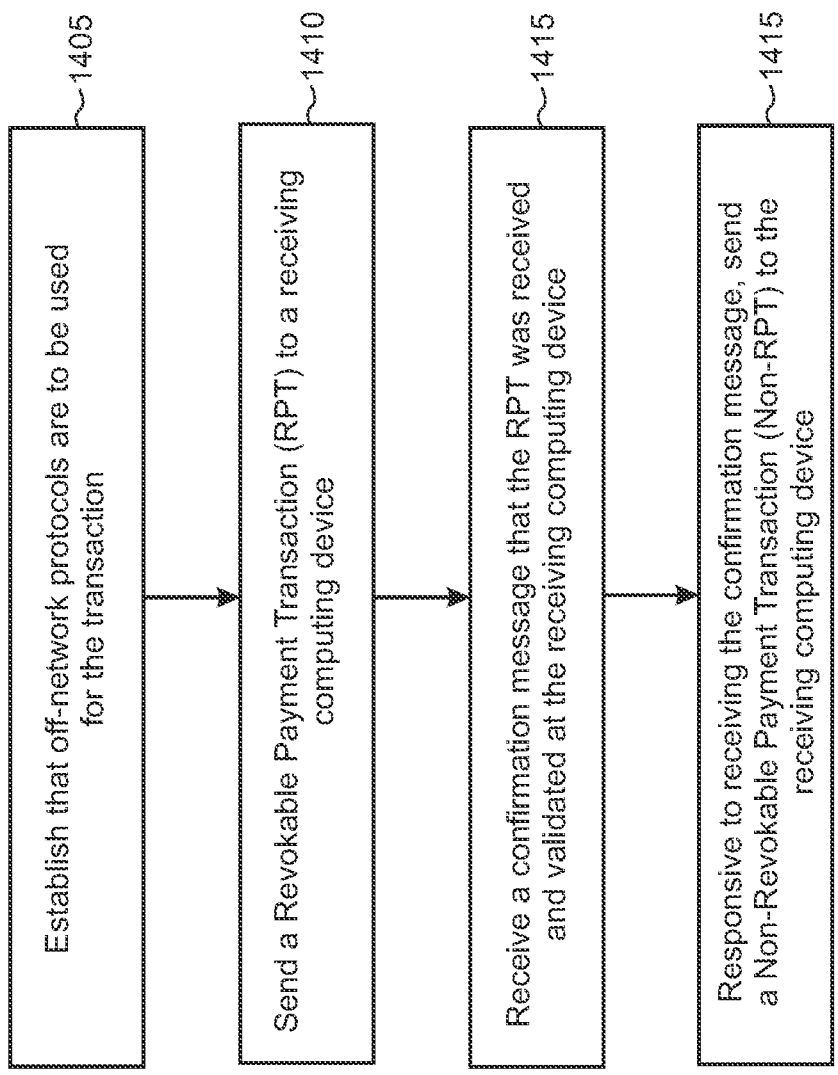

FIGS. 13 and 14 show illustrative processes performed by a sending computing device, receiving computing device, a remote ledger service, or a combination there. Although the steps are shown in sequential order, the features and actions therein may be alternatively arranged and/or certain steps may be added or removed. The process is exemplary only to show one specific implementation for understanding the present disclosure's features.

In step 1305, in FIG. 13, the sending computing device sends a Revokable Payment Transaction (RPT) to a receiving computing device, in which the RPT includes a monetary amount and a revokable term. In step 1310, the sending computing device, responsive to receiving a confirmation message that the RPT was received and validated at the receiving computing device, sends a Non-Revokable Payment Transaction (Non-RPT) to the receiving computing device. Alternatively, in step 1315, the sending computing device generates a Revoke Payment Transaction responsive to the sending computing device failing to receive the confirmation message from the receiving computing device. In this regard, the sending computing device either generates the Non-RPT or the Revoke Payment Transaction depending on the confirmation messages receipt status.

In step 1405, in FIG. 14, the sending computing device establishes that off-network protocols are to be used for the transaction. In step 1410, the sending computing device sends an RPT to a receiving computing device. In step 1415, the sending computing device receives a confirmation message that the RPT was received and validated at the receiving computing device. In step 1420, the sending computing device, responsive to receiving the confirmation message, sends a Non-RPT to the receiving computing device.

Figure 15:
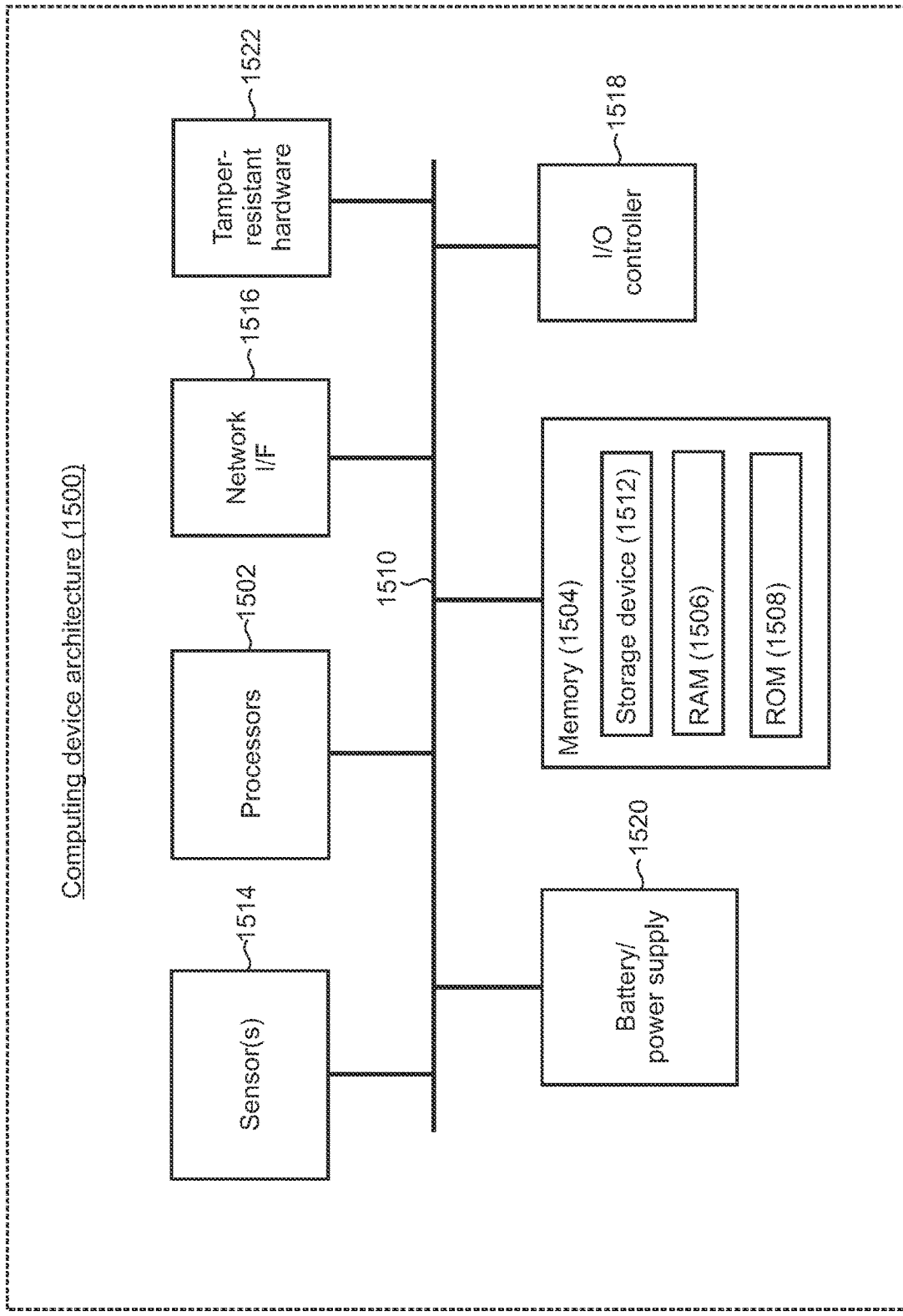
FIG. 15 shows a simplified block diagram of a computing device that may be used to implement the present leveraging tamper-resistant hardware to transfer digital currency between local devices.

FIG. 15 shows an illustrative architecture 1500 for a device, such as a smartphone, tablet, or laptop computer capable of executing the various features described herein. The architecture 1500 illustrated in FIG. 15 includes one or more processors 1502 (e.g., central processing unit, dedicated AI chip, graphics processing unit, etc.), a system memory 1504, including RAM (random access memory) 1506, ROM (read only memory) 1508, and long-term storage devices 1512. The system bus 1510 operatively and functionally couples the components in the architecture 1500. A basic input/output system containing the basic routines that help to transfer information between elements within the architecture 1500, such as during startup, is typically stored in the ROM 1508. The architecture 1500 further includes a long-term storage device 1512 for storing software code or other computer-executed code that is utilized to implement applications, the file system, and the operating system. The storage device 1512 is connected to the processor 1502 through a storage controller (not shown) connected to the bus 1510. The storage device 1512 and its associated computer-readable storage media provide non-volatile storage for the architecture 1500. Although the description of computer-readable storage media contained herein refers to a long-term storage device, such as a hard disk or CD-ROM drive, it may be appreciated by those skilled in the art that computer-readable storage media can be any available storage media that can be accessed by the architecture 1500, including solid stage drives and flash memory.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 1500.

According to various embodiments, the architecture 1500 may operate in a networked environment using logical connections to remote computers through a network. The architecture 1500 may connect to the network through a network interface unit 1516 connected to the bus 1510. It may be appreciated that the network interface unit 1516 also may be utilized to connect to other types of networks and remote computer systems. The architecture 1500 also may include an input/output controller 1518 for receiving and processing input from a number of other devices, including a keyboard, mouse, touchpad, touchscreen, control devices such as buttons and switches or electronic stylus (not shown in FIG. 15). Similarly, the input/output controller 1518 may provide output to a display screen, user interface, a printer, or other type of output device (also not shown in FIG. 15).

It may be appreciated that any software components described herein may, when loaded into the processor 1502 and executed, transform the processor 1502 and the overall architecture 1500 from a general-purpose computing system into a special-purpose computing system customized to facilitate the functionality presented herein. The processor 1502 may be constructed from any number of transistors or other discrete circuit elements, which may individually or collectively assume any number of states. More specifically, the processor 1502 may operate as a finite-state machine, in response to executable instructions contained within the software modules disclosed herein. These computer-executable instructions may transform the processor 1502 by specifying how the processor 1502 transitions between states, thereby transforming the transistors or other discrete hardware elements constituting the processor 1502.

Encoding the software modules presented herein also may transform the physical structure of the computer-readable storage media presented herein. The specific transformation of physical structure may depend on various factors in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1500 in order to store and execute the software components presented herein. It also may be appreciated that the architecture 1500 may include other types of computing devices, including wearable devices, handheld computers, embedded computer systems, smartphones, PDAs, and other types of computing devices known to those skilled in the art. It is also contemplated that the architecture 1500 may not include all of the components shown in FIG. 15, may include other components that are not explicitly shown in FIG. 15, or may utilize an architecture completely different from that shown in FIG. 15.

The computing device may further be configured with tamper-resistant hardware 1522 to execute various functions and operations discussed herein, such as the various transmissions performed by the sending computing device or the receiving computing device. The tamper-resistant hardware may be considered a device that is configured to make a private key unavailable outside its enclosure, require an authorization value in order to use its private key, be immutable, and prevent access after too many incorrect authorization value guesses, among other security features. While hardware features are discussed herein, the tamper-resistance may be configured as a hybrid of hardware and software, purely hardware, or purely software. The tamper-resistant device may exhibit signs of attempted corruption or may react when some physical intrusion is attempted. The tamper-resistant hardware may be a trusted platform module (TPM) or implemented as a Trusted Execution Environment (TEE) created as a portion of the exposed processor.

Figure 16:
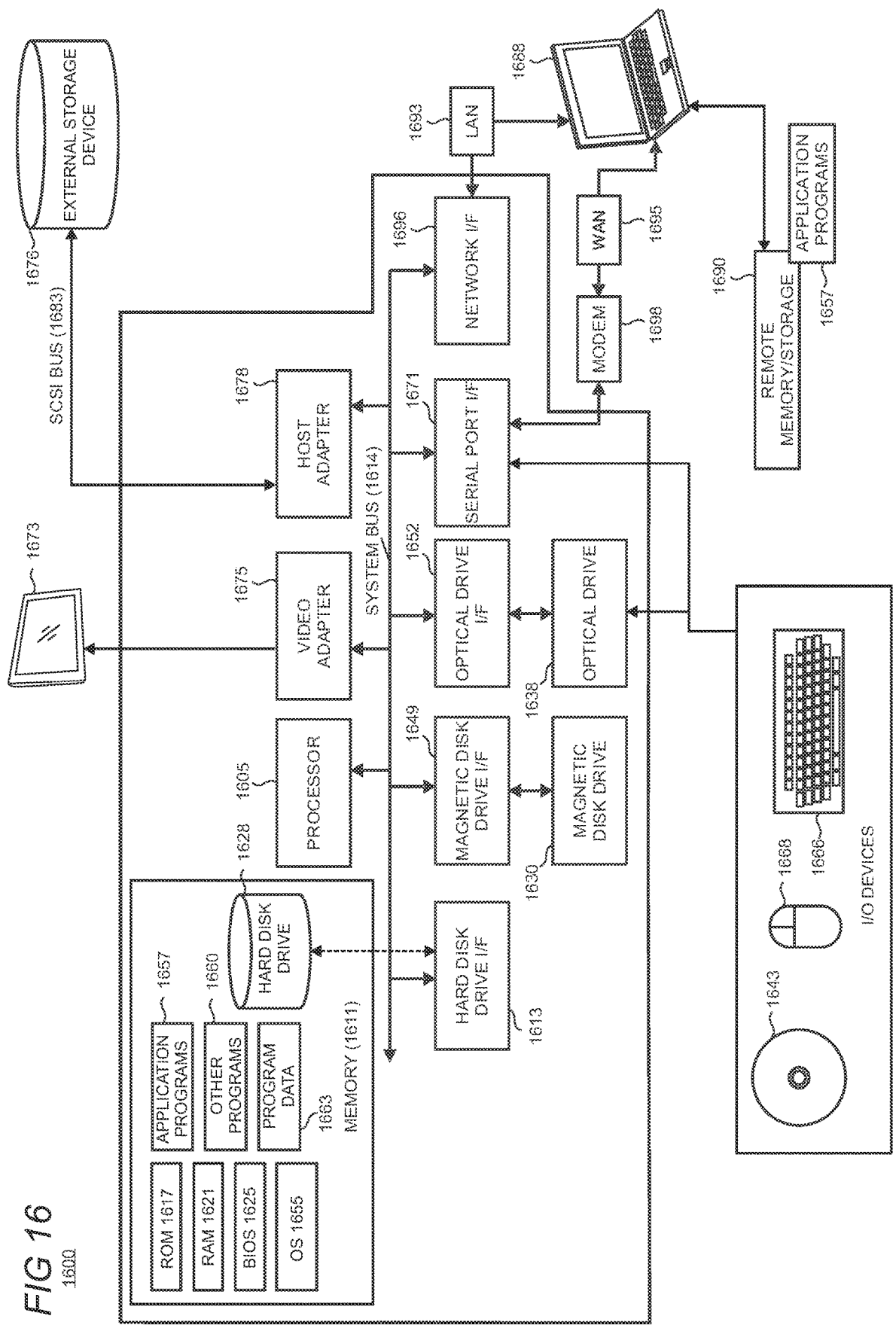
FIG. 16 shows a simplified block diagram of a computing device that may be used to implement the present leveraging tamper-resistant hardware to transfer digital currency between local devices.

FIG. 16 is a simplified block diagram of an illustrative computer system 1600 such as a remote server, smartphone, tablet computer, laptop computer, or personal computer (PC) which the present disclosure may be implemented. Computer system 1600 includes a processor 1605, a system memory 1611, and a system bus 1614 that couples various system components including the system memory 1611 to the processor 1605. The system bus 1614 may be any of several types of bus structures including a memory bus or memory controller, a peripheral bus, or a local bus using any of a variety of bus architectures. The system memory 1611 includes read only memory (ROM) 1617 and random access memory (RAM) 1621. A basic input/output system (BIOS) 1625, containing the basic routines that help to transfer information between elements within the computer system 1600, such as during startup, is stored in ROM 1617. The computer system 1600 may further include a hard disk drive 1628 for reading from and writing to an internally disposed hard disk, a magnetic disk drive 1630 for reading from or writing to a removable magnetic disk (e.g., a floppy disk), and an optical disk drive 1638 for reading from or writing to a removable optical disk 1643 such as a CD (compact disc), DVD (digital versatile disc), or other optical media. The hard disk drive 1628, magnetic disk drive 1630, and optical disk drive 1638 are connected to the system bus 1614 by a hard disk drive interface 1646, a magnetic disk drive interface 1649, and an optical drive interface 1652, respectively. The drives and their associated computer-readable storage media provide non-volatile storage of computer-readable instructions, data structures, program modules, and other data for the computer system 1600. Although this illustrative example includes a hard disk, a removable magnetic disk 1633, and a removable optical disk 1643, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present disclosure. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, are intended to cover non-transitory embodiments, and does not include waves, signals, and/or other transitory and/or intangible communication media.

A number of program modules may be stored on the hard disk, magnetic disk, optical disk 1643, ROM 1617, or RAM 1621, including an operating system 1655, one or more application programs 1657, other program modules 1660, and program data 1663. A user may enter commands and information into the computer system 1600 through input devices such as a keyboard 1666, pointing device (e.g., mouse) 1668, or touch-screen display 1673. Other input devices may include a microphone, joystick, game pad, satellite dish, scanner, trackball, touchpad, touch-sensitive device, voice-command module or device, user motion or user gesture capture device, or the like. These and other input devices are often connected to the processor 1605 through a serial port interface 1671 that is coupled to the system bus 1614, but may be connected by other interfaces, such as a parallel port, game port, or universal serial bus (USB). A monitor 1673 or other type of display device is also connected to the system bus 1614 via an interface, such as a video adapter 1675. In addition to the monitor 1673, personal computers typically include other peripheral output devices (not shown), such as speakers and printers. The illustrative example shown in FIG. 16 also includes a host adapter 1678, a Small Computer System Interface (SCSI) bus 1683, and an external storage device 1676 connected to the SCSI bus 1683.

The computer system 1600 is operable in a networked environment using logical connections to one or more remote computers, such as a remote computer 1688. The remote computer 1688 may be selected as another personal computer, a server, a router, a network PC, a peer device, or other common network node, and typically includes many or all of the elements described above relative to the computer system 1600, although only a single representative remote memory/storage device 1690 is shown in FIG. 16. The logical connections depicted in FIG. 16 include a local area network (LAN) 1693 and a wide area network (WAN) 1695. Such networking environments are often deployed, for example, in offices, enterprise-wide computer networks, intranets, and the Internet.

When used in a LAN networking environment, the computer system 1600 is connected to the local area network 1693 through a network interface or adapter 1696. When used in a WAN networking environment, the computer system 1600 typically includes a broadband modem 1698, network gateway, or other means for establishing communications over the wide area network 1695, such as the Internet. The broadband modem 1698, which may be internal or external, is connected to the system bus 1614 via a serial port interface 1671. In a networked environment, program modules related to the computer system 1600, or portions thereof, may be stored in the remote memory storage device 1690. It is noted that the network connections shown in FIG. 16 are illustrative and other means of establishing a communications link between the computers may be used depending on the specific requirements of an application of the present disclosure.

Various illustrative embodiments are disclosed herein. In one exemplary embodiment, disclosed is a sending computing device configured for sending and receiving digital currency payments, comprising: a network interface to communicate with receiving computing device; tamper-resistant hardware, which secures one or more private keys that are inaccessible outside of the tamper-resistant hardware; one or more processors; and one or more hardware-based memory devices having instructions which, when executed by the one or more processors, cause the sending computing device to: send a Revokable Payment Transaction (RPT) to a receiving computing device, in which the RPT includes a monetary amount and a revokable term over which the sending device is authorized to cancel a transaction; and execute one of the following actions: responsive to receiving a confirmation message that the RPT was received and validated at the receiving computing device, send a Non-Revokable Payment Transaction (Non-RPT) to the receiving computing device, which indicates a payment has succeeded and the revokable term from the RPT has been removed; or generate a Revoke Payment Transaction responsive to the sending device failing to receive the confirmation message from the receiving computing device.

In another example, the one or more processors are further configured to expose, on the sending device's user interface, a confirmation message that the payment has succeeded, responsive to receiving the confirmation message from the receiving computing device. As another example, the one or more processors are further configured to receive instructions that the transaction will be executed under off-network protocols. In another example, the instruction that the transaction will be executed under off-network protocols is received prior to transmitting the RPT. In another example, the one or more processors are further configured to transmit the Non-RPT to a remote ledger service when network access becomes available. As another example, the sending computing device and receiving computing device are configured to consider the transaction canceled when any communication is lost before the sending computing device receives the confirmation message. In another example, the one or more processors are further configured to expose, on the sending device's user interface, a message that indicates the transaction is canceled, responsive to the sending device failing to receive the confirmation message from the receiving computing device within a predetermined time interval. As another example, the one or more processors are further configured to transmit a Spend Authorization to the receiving computing device, in which the Spend Authorization confirms that a sending account is under exclusive control of the sending computing device is configured with tamper-resistant hardware. In another example, the one or more processors are further configured to transmit the Revoke Payment Transaction when network connection becomes available. In another example, the one or more processors are further configured to request a fresh Spend Authorization from a remote ledger service as a pass-through communication with the receiving computing device. As another example, the one or more processors are further configured to send the fresh Spend Authorization to the receiving computing device.

Another illustrative embodiment discloses a method performed at least partially by tamper-resistant hardware within a sending computing device to execute a transaction, comprising: establishing that off-network protocols are to be used for the transaction; sending a Revokable Payment Transaction (RPT) to a receiving computing device, in which the RPT includes a monetary amount and a revokable term over which the sending device is authorized to cancel a transaction; and receiving a confirmation message that the RPT was received and validated at the receiving computing device; responsive to receiving the confirmation message, sending a Non-Revokable Payment Transaction (Non-RPT) to the receiving device, which indicates a payment has succeeded and the revokable term from the RPT has been removed.

In another example, further comprising exposing, on the sending device's user interface, a confirmation message that the payment has succeeded, responsive to receiving the confirmation message from the receiving computing device. In another example, the off-network protocols are established responsively to receiving instructions from the receiving computing device. In another example, further comprising transmitting the Non-RPT to a remote ledger service when network access becomes available. As another example, wherein the sending computing device and receiving computing device are configured to consider the transaction canceled when any communication is lost before the sending computing device receives the confirmation message.

Another illustrative embodiment discloses one or more hardware-based memory devices storing computer-executable instructions which, when executed by one or more processors associated with a sending computing device, cause the sending computing device to: send a Revokable Payment Transaction (RPT) to a receiving computing device, in which the RPT includes a monetary amount and a revokable term over which the sending device is authorized to cancel a transaction; and execute one of the following actions: responsive to receiving a confirmation message that the RPT was received and validated at the receiving computing device, send a Non-Revokable Payment Transaction (Non-RPT) to the receiving computing device, which indicates a payment has succeeded and the revokable term from the RPT has been removed; or generate a Revoke Payment Transaction responsive to the sending device failing to receive the confirmation message from the receiving computing device.

In a further example, the executed instructions further cause the sending computing device to transmit a Spend Authorization to the receiving computing device, in which the Spend Authorization confirms that the sending computing device is configured with tamper-resistant hardware. As another example, the executed instructions further cause the sending computing device to transmit the Non-RPT to a remote ledger service when network access becomes available. As a further example, the executed instructions further cause the sending computing device to receive instructions that the transaction will be executed under off-network protocols Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising a sending computing device and a receiving computing device, in which the sending computing device is configured for at least sending digital currency payments and the receiving computing device is configured for receiving digital currency payments on a remote ledger service, the system comprising:
the sending computing device, comprising:
a network interface to communicate with a receiving computing device in which the receiving computing device is an intended recipient of digital currency from the sending computing device;
tamper-resistant hardware, which secures one or more private keys that are inaccessible outside of the tamper-resistant hardware;
one or more processors; and
one or more hardware-based memory devices having instructions which, when executed by the one or more processors, cause the sending computing device to:
initiate a transaction by which a digital currency is transmitted from the sending computing device to the receiving computing device to safeguard the transaction;
while there is no available connection to the remote ledger service from at least the sending device, transmit, by the sending computing device's tamper-resistant hardware, a Spend Authorization to the receiving computing device, wherein the Spend Authorization was previously acquired from the remote service and includes a digital signature attesting that the sending computing device is configured with tamper-resistant hardware that was approved by the remote ledger service;
while there is no available connection to the remc te ger service from at least the sending computing device responsive to the receiving computing device detecting the sending computing device's tamper-resistant hardware using the Spend Authorization, send, by the sending computing device, a Revokable Payment Transaction (RPT) to the receiving computing device, in which the RPT includes a monetary amount and a revokable term over which the sending computing device is authorized to cancel a transaction, the revokable term to end when the specified time has elapsed after computing device bas delivered a re okable transaction to the remote ledger service when the connection to the remote ledger service is available; and
execute one of the following actions:
responsive to receiving a confirmation message, from the receiving computing device, that the RPT was received and validated at the receiving computing device, (i) send, from the sending computing device a Non-Revokable Payment Transaction (Non-RPT) to the receiving computing device, which indicates a payment has succeeded and the revokable term from the RPT has been removed due to the receiving computing device validating the RPT from the sending computing device, (ii) display an indication, on the sending computing device's user interface, that the payment has succeeded, and (ifi) report the successful payment to the remote ledger service connection becoming established; or
responsive to the sending computing device failing to receive the confirmation message, from the receiving computing device, that the receiving computing device received and validated the RPT from the sending computing device, (i) generate a Revoke Payment transaction, (ii) display an indication, on the sending computing device's user interface, that the payment has failed, and (iii) report the failed payment to the remote two connection becoming established.

2. The sending computing device of claim 1, wherein the one or more processors are further configured to receive instructions that the transaction will be executed under off-network protocols.

3. The sending computing device of claim 2, wherein the instruction that the transaction will be executed under off-network protocols is received prior to transmitting the RPT.

4. The sending computing device of claim 1, wherein the one or more processors are further configured to transmit the Non-RPT to the remote ledger service when network access becomes available.

5. The sending computing device of claim 1, wherein the sending computing device and receiving computing device are configured to consider the transaction canceled when any communication is lost before the sending computing device receives the confirmation message.

6. The sending computing device of claim 1, wherein the one or more processors are further configured to transmit the Revoke Payment Transaction when network connection becomes available.

7. The sending computing device of claim 1, wherein the one or more processors are further configured to request a fresh Spend Authorization from the remote ledger service as a pass-through communication with the receiving computing device.

8. The sending computing device of claim 7, wherein the one or more processors are further configured to send the fresh Spend Authorization to the receiving computing device.

9. One or more hardware-based memory devices storing computer-executable instructions which, when executed by one or more processors associated with a sending computing device, receiving computing device, or a remote ledger service, cause the sending computing device, receiving computing device, or remote ledger service to:

initiate a transaction by which a digital currency is transmitted from the sending computing device to a receiving computing device, to safeguard the transaction;

while the is no available connection to the remote ledger service from at least the sending vice, transmit, by the sending computing device's tamper- resistant hardware, a Spend Authorization to the receiving computing device, wherein the Spend Authorization was previously acquired from the remote ledger service and includes a digital signature attesting that the sending computing device is configured with tamper-resistant hardware that was approved by the remote ledger service;

while there is no available connection to the remote ledger service from at least the sending computing, device responsive to the receiving computing device detecting the sending computing device's tamper-resistant hardware using the Spend Authorization, send, by the sending computing device, a Revokable Payment Transaction (RPT) to the receiving computing device, in which the RPT includes a monetary amount and a revokable term over which the sending computing device is authorized to cancel a transaction; and execute one of the following actions:

responsive to receiving a confirmation message, from the receiving computing device, that the RPT was received and validated at the receiving computing device, (i) send, from the sending computing device, a Non-Revokable Payment Transaction (Non-RPT) to the receiving computing device, which indicates a payment has succeeded and the revokable term from the RPT has been removed due to the receiving computing device validating the RPT from the sending computing device, (ii) display an indication, on the sending computing device's user interface, that the payment has succeeded, and (iii) report the successful payment to the remote ledger service upon a network connection becoming established; or responsive to the sending computing device failing to receive the confirmation message from the receiving computing device, that the receiving computing doy received and validated the RPT from the sending computing device (i) generate a Revoke Payment Transaction, (ii) display an indication, on the sending computing device's user interface, that the payment has failed, and (iii) repon the failed payment to the remote ledger service opon a network connection becoming established.

10. The one or more hardware-based memory devices of claim 9, wherein the executed instructions further cause the sending computing device to transmit the Non-RPT to the remote ledger service when network access becomes available.

11. The one or more hardware-based memory devices of claim 9, wherein the executed instructions further cause the sending computing device to receive instructions that the transaction will be executed under off-network protocols.

* * * * *